US008185932B2

(12) United States Patent
Dunn

(10) Patent No.: US 8,185,932 B2
(45) **Date of Patent: *May 22, 2012**

(54) SYSTEM AND METHOD FOR USER-CENTRIC AUTHORIZATION TO ACCESS USER-SPECIFIC INFORMATION

(75) Inventor: Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/013,036

(22) Filed: Jan. 25, 2011

(65) Prior Publication Data

US 2011/0119732 A1 May 19, 2011

Related U.S. Application Data

(63) Continuation of application No. 10/084,859, filed on Feb. 27, 2002, now Pat. No. 7,912,971.

(51) Int. Cl.
*G06F 17/00* (2006.01)
*G06F 15/16* (2006.01)
*G06F 15/173* (2006.01)

(52) U.S. Cl. ............. 726/1; 709/203; 709/217; 709/224

(58) Field of Classification Search .................. 709/203, 709/217–219, 223–226; 726/1–2
See application file for complete search history.

(56) References Cited

U.S. PATENT DOCUMENTS 5,163,147 A 11/1992 Orita
5,414,852 A 5/1995 Kramer et al.
5,613,147 A 3/1997 Okamura et al.
5,889,952 A 3/1999 Hunnicutt et al.
5,941,947 A 8/1999 Brown et al.
5,995,972 A 11/1999 Allgeier
5,999,711 A 12/1999 Misra et al.
6,070,243 A 5/2000 See et al.
6,253,203 B1 6/2001 O'Flaherty et al.
6,260,148 B1 7/2001 Aggarwal et al.
6,269,369 B1 7/2001 Robertson
6,275,824 B1 8/2001 O'Flaherty et al.
6,308,173 B1 10/2001 Glasser et al.

(Continued)

OTHER PUBLICATIONS

Liberty Architecture Overview Version 1.0 Published Jul. 11, 2002 by the Liberty Alliance Project http://xml.coverpages.org/liberty-architecture-overview-v1.0.pdf, 41 pages.

(Continued)

*Primary Examiner* — Joshua Joo
(74) *Attorney, Agent, or Firm* — Senniger Powers LLP

(57) ABSTRACT

In a network computing environment, a user-centric system and method for controlling access to user-specific information maintained in association with a web-services service. When a web-services client desires access to the user-specific information, the client sends a request. The request identifies the reasons/intentions for accessing the desired information. The request is compared to the user's existing access permissions. If there is no existing access permission, the request is compared to the user's default preferences. If the default preferences permit the requested access, an access rule is created dynamically and the client's request is filled, without interrupting the user. If the default preferences do not permit the request to be filled, a consent user interface may be invoked. The consent user interface presents the user with one or more consent options, thereby permitting the user to control whether the client will be given access to the user-specific information.

17 Claims, 16 Drawing Sheets

U.S. PATENT DOCUMENTS

| | | | | |
|---|---|---|---|---|
| 6,338,096 | B1 | 1/2002 | Ukelson | |
| 6,381,579 | B1 | 4/2002 | Gervais et al. | |
| 6,408,336 | B1 | 6/2002 | Schneider et al. | |
| 6,482,752 | B1 | 11/2002 | Yamazaki et al. | |
| 6,526,513 | B1 | 2/2003 | Shrader et al. | |
| 6,571,279 | B1 | 5/2003 | Herz et al. | |
| 6,631,381 | B1 | 10/2003 | Couch et al. | |
| 6,708,276 | B1 | 3/2004 | Yarsa et al. | |
| 6,741,989 | B1 * | 5/2004 | Seltzer et al. | 1/1 |
| 6,820,204 | B1 | 11/2004 | Desai et al. | |
| 6,850,943 | B2 | 2/2005 | Teixeira et al. | |
| 6,859,212 | B2 | 2/2005 | Kumar et al. | |
| 6,941,475 | B1 | 9/2005 | Assetto et al. | |
| 6,985,955 | B2 | 1/2006 | Gullotta et al. | |
| 7,454,464 | B2 | 11/2008 | Puthenkulam et al. | |
| 7,478,157 | B2 * | 1/2009 | Bohrer et al. | 709/226 |
| 7,490,135 | B2 | 2/2009 | Klug et al. | |
| 7,730,092 | B2 * | 6/2010 | Lawson et al. | 707/783 |
| 2001/0023421 | A1 | 9/2001 | Numao et al. | |
| 2001/0042126 | A1 | 11/2001 | Wong et al. | |
| 2001/0049620 | A1 | 12/2001 | Blasko | |
| 2002/0004909 | A1 * | 1/2002 | Hirano et al. | 713/200 |
| 2002/0019828 | A1 | 2/2002 | Mortl | |
| 2002/0023059 | A1 | 2/2002 | Bari et al. | |
| 2002/0026345 | A1 | 2/2002 | Juels | |
| 2002/0049907 | A1 | 4/2002 | Woods et al. | |
| 2002/0091639 | A1 | 7/2002 | Mandahl et al. | |
| 2002/0091947 | A1 | 7/2002 | Nakamura | |
| 2002/0095571 | A1 | 7/2002 | Bradee | |
| 2002/0133395 | A1 | 9/2002 | Hughes et al. | |
| 2002/0188572 | A1 | 12/2002 | Bleizeffer et al. | |
| 2003/0041154 | A1 | 2/2003 | Tran | |
| 2003/0081791 | A1 | 5/2003 | Erickson et al. | |
| 2003/0097451 | A1 | 5/2003 | Bjorksten et al. | |
| 2003/0130867 | A1 * | 7/2003 | Coelho et al. | 705/2 |
| 2003/0191703 | A1 | 10/2003 | Chen et al. | |
| 2003/0196094 | A1 | 10/2003 | Hillis et al. | |
| 2004/0010603 | A1 | 1/2004 | Foster et al. | |
| 2005/0131830 | A1 | 6/2005 | Juarez et al. | |
| 2005/0240622 | A1 | 10/2005 | Cheung | |
| 2007/0021980 | A1 * | 1/2007 | Holden | 705/2 |
| 2007/0214144 | A1 | 9/2007 | Lawson et al. | |
| 2009/0300509 | A1 * | 12/2009 | Mathew et al. | 715/739 |
| 2011/0041164 | A1 * | 2/2011 | Holden | 726/4 |

OTHER PUBLICATIONS

Liberty Protocols and Schemas Specification Version 1.0 Published Jul. 11, 2002 by the Liberty Alliance Project http://xml.coverpages.org/liberty-architecutre-protocols-schemas-v1.0.pdf, 27 pages.

Liberty Authentication Context Specification Version 1.0 Published Jul. 11, 2002 by the Liberty Alliance Project http://sml.coverpages.org/liberty-architecture-authentication-context-v1.0.pdf, 35 pages.

Newton's Telecom Dictionary 19th Edition by Harry Newton, CMP Books, 2003, p. 736.

The Role of Graph Model and Conflict of Interest, ACM Transactions on Information and System Security, vol. 2, No. 1, Feb. 1999, pp. 3-33 by Matunda Nyanchama and Sylvia Osborn.

The ARBAC97 Model for Role-Based Administration of Roles, ACM Transactions on Information and System Security, vol. 2, No. 1, Feb. 1999, pp. 105-135 by Ravi Sandhu, Venkata Bhamidipati and Qamar Munawer.

Configuring Role-Based Access Control to Enforce Mandatory and Discretionary Access Control Policies, ACM Transactions on Information and System Security, vol. 3, No. 2, May 2000, pp. 85-106 by Sylvia Osborn, Ravi Sandhu and Qamar Munawer.

Role-Based Authorization Constraints Specification, ACM Transactions on Information and System Security, vol. 3, No. 4, Nov. 2000, pp. 207-226 by Gail-Joon Ahn and Ravi Sandhu.

Why UDDI Will Succeed, Quietly: Two Factors Push Web Services Forward, The Stencil Scope, 7 pgs., Apr. 2001 by Brent Sleeper.

The YGuard Access Control Model: Set-Based Access Control, SACMAT'01, May 3-4, 2001, pp. 75-84 by Ty van den Akker, Quinn O. Snell and Mark J. Clement (ACM Press—ISBN 1-58113-350).

Fine Grained Access Control for SOAP E-Services, WWW10, May 1-5, 2001, pp. 504-513 by Ernesto Damiani, Sabrina DeCapitani di Vimercati, Stefano Paraboschi, and Pierangela Samarati (ACM Press—ISBN 1-58113-348).

Web Services: High Stakes Amid the Hype, The Washington Post, Oct. 18, 2001, 4 pgs. By Leslie Walker.

W3C Translations—XML in 10 Points, available at www.w3.org/XML/1999/XML-in-10-points, Copyright 1999-2000, 4 pgs. By Bert Bos.

W3C Initiative—P3P and Privacy on the Web FAQ, available at www.w3.org/P3P/p3pfaq.html, last revised Jun. 22, 2001, 11 pgs.

W3C Initiative—P3P 1.0: A New Standard in Online Privacy, available at www.w3.org/P3P/brochure.html, Copyright 1997-2000, 6 pgs.

W3C—A P3P Preference Exchange Language 1.0 (APPEL 1.0)—W3C Working Draft Feb. 26, 2001, available at www.w3.org/TR/P3P-preferences.html, 50 pgs, by Lorrie Cranor, Marc Langheinrich, and Massimo Marchiori.

Web Services Routing Protocol (WS-Routing), dated Oct. 23, 2001, available at http://msdn.microsoft.com/library/en-us/dnglobspec/html/ws-routing.asp, by Henrik F. Nielsen and Satish Thatte.

* cited by examiner

SYSTEM AND METHOD FOR USER-CENTRIC AUTHORIZATION TO ACCESS USER-SPECIFIC INFORMATION

CLAIM OF PRIORITY

This patent application claims the benefit of priority, under 35 U.S.C. Section 119(e), to Melissa W. Dunn, U.S. patent application Ser. No. 10/084,859, entitled "System and Method for User-Centric Authorization to Access User-Specific Information," filed on Feb. 27, 2002, now U.S. Pat. No. 7,912,971.

TECHNICAL FIELD

The present invention relates to the field of controlling access to information associated with a web-services user. In particular, this invention relates to a system and method for allowing a web-services user to control access to user-specific information stored with a web-services service by providing the user with control of access control settings with control to determine dynamically whether to grant or deny an access request that does not comply with default access control settings.

BACKGROUND OF THE INVENTION

Users of wide-area networks, such as the Internet, often express concerns regarding the privacy of user-specific information, such as personal information. Such privacy concerns are not only important to users, they are also important to businesses and other organizations that seek to employ the Internet and World Wide Web for business purposes, public purposes, governmental purposes, and so on. The World Wide Web Consortium (W3C) has proposed a method that allows users to control more of their personal information. This method is referred to as the Platform for Privacy Preferences Project (P3P). In general, P3P attempts to provide a standardized format for expressing the privacy policies associated with a web site. The goal of P3P is to enable users to be able to access, read, and interpret such privacy policies. Another goal is to increase user confidence by allowing users to determine whether a web site's privacy policies are consistent with the user's own preferences with regard to sharing their personal information. With P3P, web site privacy policies can be parsed (e.g., by a P3P compatible web browser) and compared to the user's preferences.

With P3P, web sites provide their privacy policies in a standardized format. The general format chosen for P3P uses the Extensible Markup Language (XML) standard. In general, XML provides a method for assembling structured data in a text file format. XML wad developed to facilitate an easy transfer of data across the World Wide Web. XML has been a W3C standard since 1998 and is generally known in the art. In the context of P3P, W3C has also proposed an XML-based language that is referred to as A P3P Preference Exchange Language or APPEL. APPEL is intended to allow users to identify their policy preferences. These policy preferences can thereafter be used by a user-agent to automate decisions regarding privacy issues. Details regarding APPEL version 1.0 are available from the W3C in a document entitled "A P3P Preference Language 1.0 (APPEL 1.0), W3C Working Draft 26 Feb. 2001." One of the problems with APPEL, as presently understood, is that it is not easily used or understood by end users.

Another, generally unrelated area presently being developed by the assignee of the present invention involves the provision of web-services, sometimes referred to as software services or XML services. Web-services involve a new, user-centric computing model. More particularly, web-services connect Internet applications, devices, and services in a way that effectively provides a personal network that works on behalf of a web-services user. Such web-services include, for example, personal profiles, electronic calendars and contact lists, electronic in-boxes, electronic wallets, preferred application settings, electronic photo albums, news and sports categories, financial information, and so on. As can be appreciated, such web-services will typically gather and store user-specific personal information. It is expected that web-services users will prefer to maintain as much control as possible over who accesses such information, for what purposes, and using which methods.

In view of the foregoing, there is a need for a user-centric system and method for controlling access user-specific information maintained in connection with a service provided by a web-services provider.

SUMMARY OF THE INVENTION

The invention generally relates to methods and systems for allowing a web-services user to control access to user-specific information stored in association with a software service offered by a web-services provider. The party requesting access to the user-specific information may be referred to as a client or client system. One or more access control lists are preferably associated with the user-specific information. The access control lists preferably identify, for example, which clients have access to the user-specific information, for what purposes, and by what methods of access. Further, each user preferably identifies a set of default access preferences.

With the present invention, if a client requests access to user-specific information and the access control list does not authorize the access request, an access control engine may be invoked. The access control engine compares the client's access request to the user's default access preferences. If the access request falls within the boundaries of the default preferences, the access control list may be automatically updated, thereby permitting the client's request to be filled. This may be referred to as a silent negotiation because the user's task flow need not be interrupted to complete the access request (despite the fact that, prior to the request, the access control list did not permit the client's request). If, however, the client's access request falls outside of the boundaries of the user's default access preferences, the request is denied or a consent user interface is invoked in an effort to "renegotiate" the access request.

The consent user interface normally interrupts the user's task flow by presenting a consent menu to the user. In one form, the consent menu identifies the client, the information requested, the purpose for requesting the information, the form of access desired (e.g., read only or read/write), a value proposition associated with the request, and/or how (if at all) the client will share the information. The user is preferably prompted to accept or reject the access request. If the user accepts the access request, the access control list is updated accordingly, and the request is filled. If the user rejects the access request, the request is preferably denied.

In accordance with one aspect of the invention, a method controls access to user specific information in a network computing environment. The environment includes a web-services provider that provides a web-based software service, a user of the service provided by the web-services provider, and a client of the web-services provider. The web-services provider maintains a data store of user-specific information associated with the user in connection with the service. The client seeks access to some of the user-specific information maintained in the data store. The method includes obtaining an access request message from the client and directed to the software service requesting user-specific information. The request message includes an access request parameter indicating the client's desired form of access to the user-specific information in the data store. The access request parameter is compared to an access control list associated with the software service. The access control list identifies whether the user has granted the form of access requested by the client. The client is permitted to have access to the requested user-specific information in the data store if the user has granted the form of access requested by the client. An access control engine is invoked if the user has not previously granted the form of access requested by the client. The access control engine determines an intended use by the client of the requested user-specific information in the data store. The access control engine compares the determined intended use by the client with a default access control instruction. The access control engine updates the access control list to permit the client to have access to the requested user-specific information in the data store if the default access control instruction permits the determined intended use. The access control engine transmits a fault response to the client if the default access control instruction does not permit the determined intended use.

In accordance with another aspect of the invention, a method controls access to user-specific information in a data store within a network computer system. The network computer system includes a web-services provider, a user of a service provided by the web-services provider, and a client of the web-services provider. The web-services provider maintains a data store of user-specific information associated with the user. The client seeks access to the user-specific information in the data store. The method of controlling access includes operatively receiving, at the web-services provider, a request from the client to access the user-specific information in the data store. An intended use by the client of the user-specific information is determined. An allowed level of access permitted by the user is determined. The determined intended use is compared with the determined allowed level of access. The request to access the user-specific information in the data store from the client is completed when the determined intended use is within the determined allowed level of access.

In accordance with still another aspect of the invention, a user-centric method controls access to user-specific information contained in a data store in connection with a network computing environment. The network computing environment includes a web-services provider and a user of a service provided by the web-services provider. The web-services provider maintains the data store of user-specific information associated with the user. The user communicates with the web-services provider via a network communication device having a display interface and a selection interface. The user-centric method of controlling access includes identifying the user. A client of the web-services provider, to which the user desires to grant access to the user-specific information in the data store, is also identified. A method of access by which the user is willing to allow the client to access the user-specific information in the data store is identified. A level of access to the user-specific information in the data store the user desires to impose on the client is identified. An access control rule is written to an access control list associated with the data store. The access control rule limits the client's access to the user-specific information in the data store to the identified method and the identified level.

In accordance with yet another aspect of the invention, a system controls access to user-specific information in a network computing environment. The system includes a web-services service provider and a user of a service of the web-services provider. The web-services provider maintains a data store of user-specific information associated with the user. The web-services provider also maintains a set of default access preferences that define a list of default access permissions allowed by the user. A client of the web-services provider requests access to the data store of user-specific information associated with the user. The client identifies an intended use by the client of the user-specific information in the data store. An access control engine operatively receives the client request to access the data store of user-specific information, and dynamically creates an access control rule by comparing the set of default access preferences with the intended use by the client. The access control rule grants the requested access if the intended use by the client is within the list of default access permissions defined by the set of default access preferences.

In accordance with another aspect of the invention, a method controls access to a data store of user-specific information in a network computing environment being accessed by a client and a user. The system includes a web-services system providing a software service to the user. The web-services system maintains the data store of user-specific information in connection with the software service. A data store of default access preferences defines a list of predetermined access permissions allowed by the user with respect to the data store of user-specific information. The client desires access to the data store of user-specific information and transmits an access request message. The access request message has a parameter indicative of a desired form of access to the data store of user-specific information. An access control interface associated with the web-services system receives the access request message. The access control interface compares the desired form of access to an access control list associated with the software service. The access control list identifies whether the user has granted the requested form of access requested by the client. An access control engine determines an intended use by the client of the user-specific information in the data store. The access control engine also determines a default access preference defining a list of default access permissions to the data store of user-specific information that the user has allowed. The access control engine compares the determined intended use with the default access permissions, and dynamically creates an access control rule granting the desired access of the client if the intended use is permitted by the default access permissions.

In accordance with still another aspect of the invention, a method controls access to user-specific information in a data store in a network computing environment. The network computing environment includes a web-services provider and a user of a service provided by the web-services provider. The web-services provider maintains the data store of user-specific information associated with the user. A third party is in digital communication with the web-services provider. The third party desires access to the user-specific information in the data store. The user communicates with the web-services provider via a network communication device having a display interface and a selection interface. The method of controlling access includes obtaining, at the web-services provider, a digital request message from the third party desiring access to the user-specific information in the data store. The intended purpose of the third party for accessing the user-specific information in the data store is determined. An option list is generated. The option list has at least one entry therein that is based on the determined intended purpose of the third party for accessing the user-specific information in the data store. An option menu is displayed to the user on the display interface of the network communication device. The option menu reflects the generated option list. The option menu prompts the user to accept or reject at least one option using the selection interface of the network communication device. A selection signal indicative of whether the user accepted or rejected the at least one option is received from the network communication device. An access control rule is created based on the received selection signal. The access control rule defines an extent of access to the user-specific information in the data store that is granted to the third party.

In accordance with another aspect of the invention, a method includes providing and selecting from a menu displayed on a display interface in a network computing environment. The network computing environment includes a web-services provider, a user of a service provided by the web-services provider. The web-services provider maintains a data store of user-specific information associated with the user. A third party is in digital communication with the web-services provider. The third party desires access to the user-specific information in the data store. The user communicates with the web-services provider via a network communication device having a display interface and a user selection interface. The method includes retrieving an intentions document associated with the third party desiring access to the user-specific information in the data store. The intentions document identifies a purpose for which the third party desires access to the user-specific information in the data store. The intentions document identifies a value proposition associated with the purpose for which the third party desires access to the user-specific information in the data store. The intentions document identifies a method by which the third party proposes to access the user-specific information in the data store. A set of menu entries is generated. The set identifies an identity of the third party and the user-specific information in the data store to which the third party desires access. The set also identifies the purpose for which the third party desires access to the user-specific information in the data store. The set identifies the value proposition associated with the purpose for which the third party desires access to the user-specific information in the data store. The set also identifies the method by which the third party proposes to access the user-specific information in the data store. The set of menu entries is displayed on the menu on the display interface of the network communication device. The user is prompted to authorize or deny the third party access to the user-specific information in the data store. A selection signal is operatively received that is indicative of whether the user authorized or denied the third party to access the user specific information in the data store. An access control rule is created that is indicative of whether the user authorized the third party to access the user-specific information in the data store.

In accordance with still another aspect of the invention, an access control engine is associated with a web-services provider for use in a network computing environment. The network computing environment includes the web-services provider providing a software service, a user of the software service provided by the web-services provider, and a client. The web-services provider maintains a data store of user-specific information in connection with the software service. An access control list associated with the data store of user-specific information identifies existing access permissions to the data store of user-specific information. The web-services provider also maintains a data store of user-specific default access preferences. The client desires access to the data store of user-specific information and transmits an access request message to the web-services provider. The access control engine includes schema for receiving and parsing the access request message. The schema identify an intended use by the client of the user-specific information in the data store. A validation engine determines if the existing access permissions identified in the access control list permit the client to access the data store of user-specific information for the identified use. A policy engine is invoked if the existing access permissions identified in the access control list do not permit the client to access the data store of user-specific information for the identified intended use. The policy engine dynamically determines an access control rule by comparing the user-specific default access preferences with the identified intended use. The validation engine writes the access control rule to the access control list.

Alternatively, the invention may comprise various other methods and systems.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

General Overview

Figure 1:
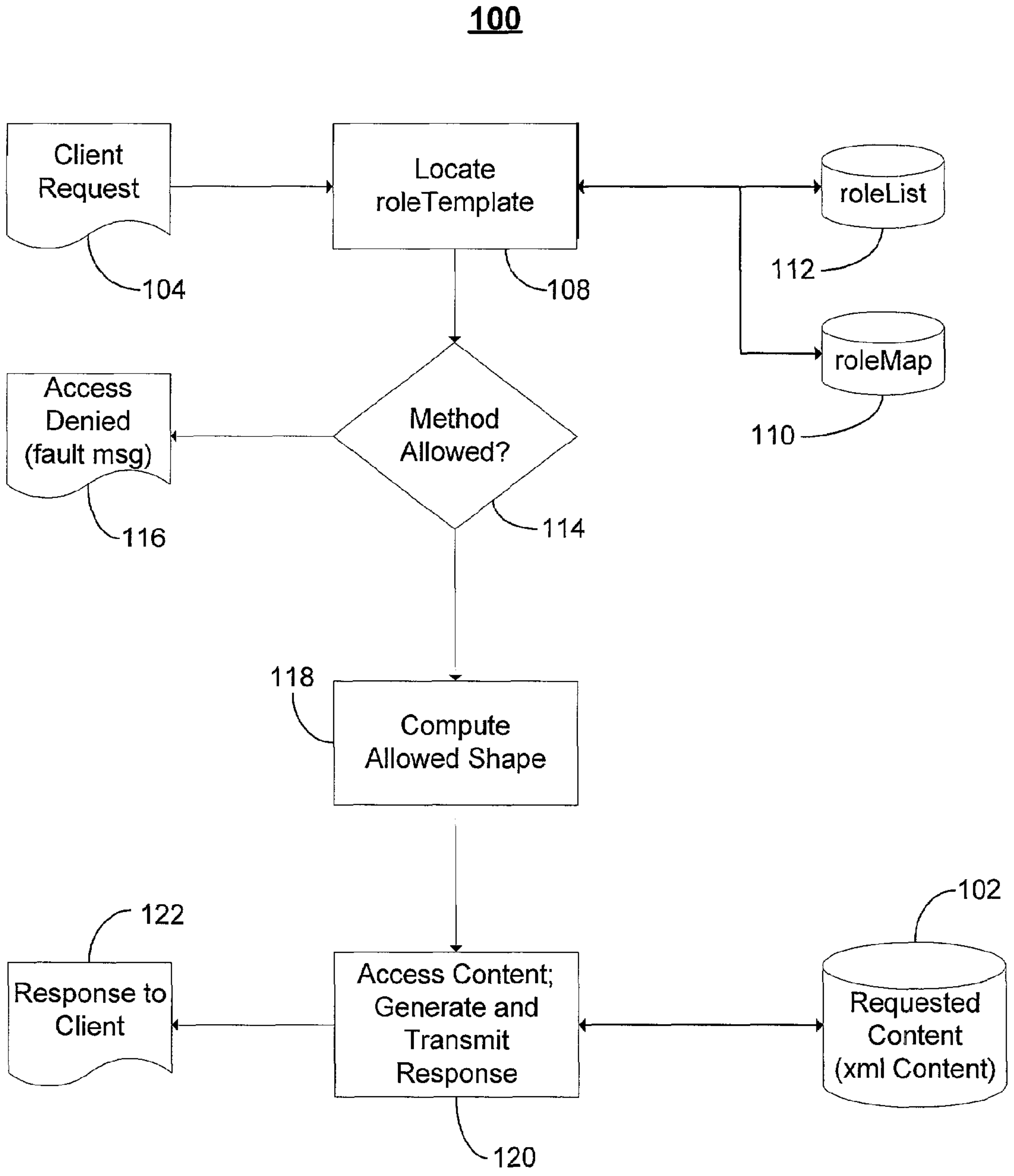
FIG. 1 is a simplified flowchart illustrating aspects of one embodiment of a user-centric method of controlling access to user-specific information in a network computing environment.

The present disclosure generally relates to methods and systems for allowing a web-services end user to control access permissions associated with user-specific information stored in association with one or more services offered by a web-services provider. In this regard, user-specific information includes, for example, personal information, preferences, data and media content maintained on behalf of the user, lists, and the like. It should be appreciated, however, that user-specific information is not necessarily personal or directly related to the user. It is information that is stored on behalf of the user in association with a web-services service. Access control may be referred to as "authorization." In general, authorization involves privacy and consent. Privacy refers to the ability of a web-services user to control access to that user's user-specific information. The user preferably controls, for example, who can access such information, by what methods, during what times, for what purposes, and so on. Consent may be generally viewed as the process by which a user determines how much privacy to retain or surrender. Consent also reflects the permissions granted by the user that allow sharing of user-specific information.

By way of example, an end user may be an individual, a community (e.g., a family or a club), or an organization (e.g., a company or a church) whose user-specific information is stored in a data store associated with a web-services service. Web-services generally refers to a provider of a variety of software-related services, typically (but not necessarily) accessed over a wide area network such as the Internet/World Wide Web. Such services may include, for example, a demographic profile of the end user, a financial profile of the end user, an electronic in-box, an investment portfolio, a photo album, a travel profile, a media database (e.g., movies, music, television, and the like), grocery lists, sports information (e.g., the system may track information regarding the end user's favorite teams), news information tailored to the end user's interests, and the like. An end user may interact with his/her services directly or through a web-services client.

In some cases, the end user may not own or control access to the user-specific information associated with that end user. For example, a user may be managed. A manager of such a managed user controls access to the managed user's user-specific information. Such managed users may include, for instance, children under a particular age. As another example, the end user may be an employee whose employer manages access to user-specific information associated with the employee.

In general, a web-services client may include a program or device that has a need (e.g., due to a request by the end user) to access user-specific information stored in association with one or more of the end user's web-services services. For example, a web-services client may be an application from a different end user that seeks user-specific information (e.g., calendar information). A web-services client may be a gateway or a website that seeks user-specific information regarding the end user to allow the client to complete a desired task (e.g., to present a targeted advertisement, to complete an on-line sale, and so on). A web-services client could also be an application program that requires access to the end user's information in order to complete a program task (e.g., access address information to complete an electronic message or access calendar information to complete a "to do" list). A web-services client could also be device-oriented. For example, a web-services client could be a digital paging service that sends market, sports, or other time sensitive information for display on a user's pager, digital telephone, personal digital assistant, or the like.

A web-services client's intended use of the user-specific information can be broadly characterized as being a primary use or a secondary use. Primary uses are those related to completing a requested or desired end-user task such as customizing the news (e.g., sports or financial) presented to the user. Secondary uses are those relating to completing a client-desired task such as presenting targeted advertisements on behalf of the client or others.

In one embodiment of a system and method for controlling access to user-specific information, the end user defines a default set of access rules/preferences regarding his/her web-services user-specific information. Such default set identifies the user's predetermined access permissions. For example, the end user may create a default set via a user interface that directs the user to select among specific options. In the alternative, or in addition, the end user may use and/or edit predefined default access settings.

In such an embodiment, when the user has not already granted access to the client, an access control engine preferably refers to the user's default settings to determine whether a particular web-services client is authorized to access the end user's user-specific information. For example, the access control engine compares the client's intentions and preferred method of access against the user's default settings. In this regard, intentions generally refer to the client's purposes for requesting the information (e.g., why the information is needed and how the information will be used) and are associated with the type of information requested. If the user's default settings permit that client to access the requested information based on the client's intentions and the identified method, the access control engine writes appropriate rules to access control lists associated with the particular services affected and fills the client's request. This may be referred to as a "silent negotiation" because the end user is not interrupted or further prompted for consent because that user has already authorized the particular request (via default preference settings).

If a client request does not fall within the bounds of the end users' default settings, the end user is preferably presented with an opportunity to "renegotiate" the client's access request. In one embodiment, for example, a consent user interface ("consent UI") is displayed to the end user that identifies any or all of the following: (1) the requesting party (the client); (2) the information requested; (3) how the information will be used; (4) the method by which the information is to be accessed (e.g., read or write); (5) why the client wants the information; and (6) what the end user stands to gain by granting access (sometimes referred to herein as a value proposition). Based on the information displayed, the user can either authorize or deny the access request.

Preferably, each access request message submitted by a client is composed and transmitted using the Simple Object Access Protocol (SOAP). SOAP is an XML schema for sending messages. SOAP messages are typically carried in the body of an HTTP Post. SOAP schema generally adheres to the following format:

```
<Envelope>
  <Header>
    {any} - any well formed XML Headers
  </Header>
  <Body>
    {any} - any well formed XML Body Content
  </Body>
</Envelope>
```

Each success or failure message returned to the client in response to such request message is also composed and transmitted in an XML compatible SOAP format.

In another embodiment, a consent system provides a centralized system and method for managing consent transactions.

The foregoing overview is intended to provide a general context and is not intended to limit the claims in any way.

Detailed Discussion of Exemplary Figures and Preferred Embodiments

FIG. 1 is a simplified flowchart illustrating a user-centric method of controlling access to user-specific information in a network computing environment. In particular, the flowchart relates to a network computing environment 100 in which a web-services provider stores user-specific information in a data store 102. In this context, a third party (referred to in FIG. 1 as a web-services client) desires access to some or all of the stored information 102. For example, the client may be an Internet web site or portal that wishes to present a targeted advertisement to the user. In order to select an appropriate advertisement, the client wants access to demographic information regarding the user. Such demographic information is among the stored user-specific information 102.

As illustrated FIG. 1, the web-services client submits an access request message 104 requesting access to stored information 102. In one embodiment, the access request message 104 preferably includes one or more parameters that identify a digital identifier of the client, a desired subject matter (e.g., which service and what user-specific information), the desired method of access, and/or the client's reason(s) for requesting access to the information. As discussed above, access request message 104 preferably comprises a SOAP message.

For purposes of illustration, it will be assumed that the particular web-services service at which the desired information is stored receives and parses access request message 104. It should be understood, however, that there are many ways of implementing the many aspects of the inventive system and method illustrated herein. Upon receipt of access request message 104, the service compares the access request to an access control list and determines whether to grant or deny the client's request. More particularly, in the embodiment of FIG. 1, the service determines the method of access requested by the client (block 108). A set of predetermined access methods are preferably identified by one or more templates. Such templates are sometimes referred to herein as roleTemplates. One possible method template allows the client to read certain user-specific information but not to delete or write such information. This template might be appropriate when a client desires access to a user's demographic information. Another method template might allow the client to read existing information and to write new information, but not to delete or overwrite existing information. Such a template might be appropriate if the client desires access to a user's calendar or business schedule. Other possible method templates include, for example a template that allows the client to read and overwrite any user-specific information.

After determining the client's desired method of access, the service also determines whether the type of user-specific information requested is stored in that service. This is found in a service-wide structure (referred to in FIG. 1 as a roleMap 110) that defines the type of user-specific information stored in connection with that service. The roleMap 110 also identifies any service-wide access limitations (e.g., user-independent access restrictions).

It should be appreciated that the type of user-specific information stored in a web-services service can be categorized in various ways. For example, user-specific information may be categorized relatively narrowly, on a per service basis. Such a narrow organization might identify particular information and data types such as, user name, user age, user address, credit card number, and the like. User-specific information can also be categorized at a relatively broader level. For example, user-specific information might be identified as public, private, confidential, top secret, and so on.

The service preferably first determines whether the user has already permitted the client to access the requested user-specific information, using the desired method. These existing permissions are maintained in an access control list (referred to in FIG. 1 as a roleList 112). As illustrated in system 100, the access control list comprises a per user, per service document. In one form, the access control list identifies the user (e.g., a user ID) and the roles allowed for that service. In this context, a role preferably identifies which clients have access to the user-specific information (e.g., a client ID), and which methods each client is allowed to employ (e.g., which roleTemplate). In other words, each access control list preferably includes a plurality of role entries. Each role entry identifies who is allowed to access the user-specific information, the particular information they are permitted to access, and the method of access permitted. For example, a role entry might indicate that a particular client ID is allowed to have read-only access to all public information in the data store. As another example, a role might identify that a particular user is given read-only access to any user-specific information if that user is using a particular application.

A role may also include one or more wildcards. For example, a role could identify that any non-specified user is given read-only access to any user-specific information if that user is using a particular application.

Referring still to FIG. 1, assuming that the client has an entry in the access control list, at block 114, the service determines if the access control list and roleMap authorize client's requested method of access. If not, a fault message 116 is returned to the client. If the requested method is authorized, the service computes the allowed shape of access (block 118). As used in connection with FIG. 1, the term shape is analogous to a filter—the service computes what information is accessible and how to access such information. Once the service computes the allowed shape, it accesses the information (block 120) in the data store 102 (e.g., reads the information, or writes the information, and so on) and returns a response 122 to the client. For example, if the client submitted a query request, the response 122 would return the requested user-specific information. If the client submitted a write request, response 122 indicates that the information has been written.

Figure 2:
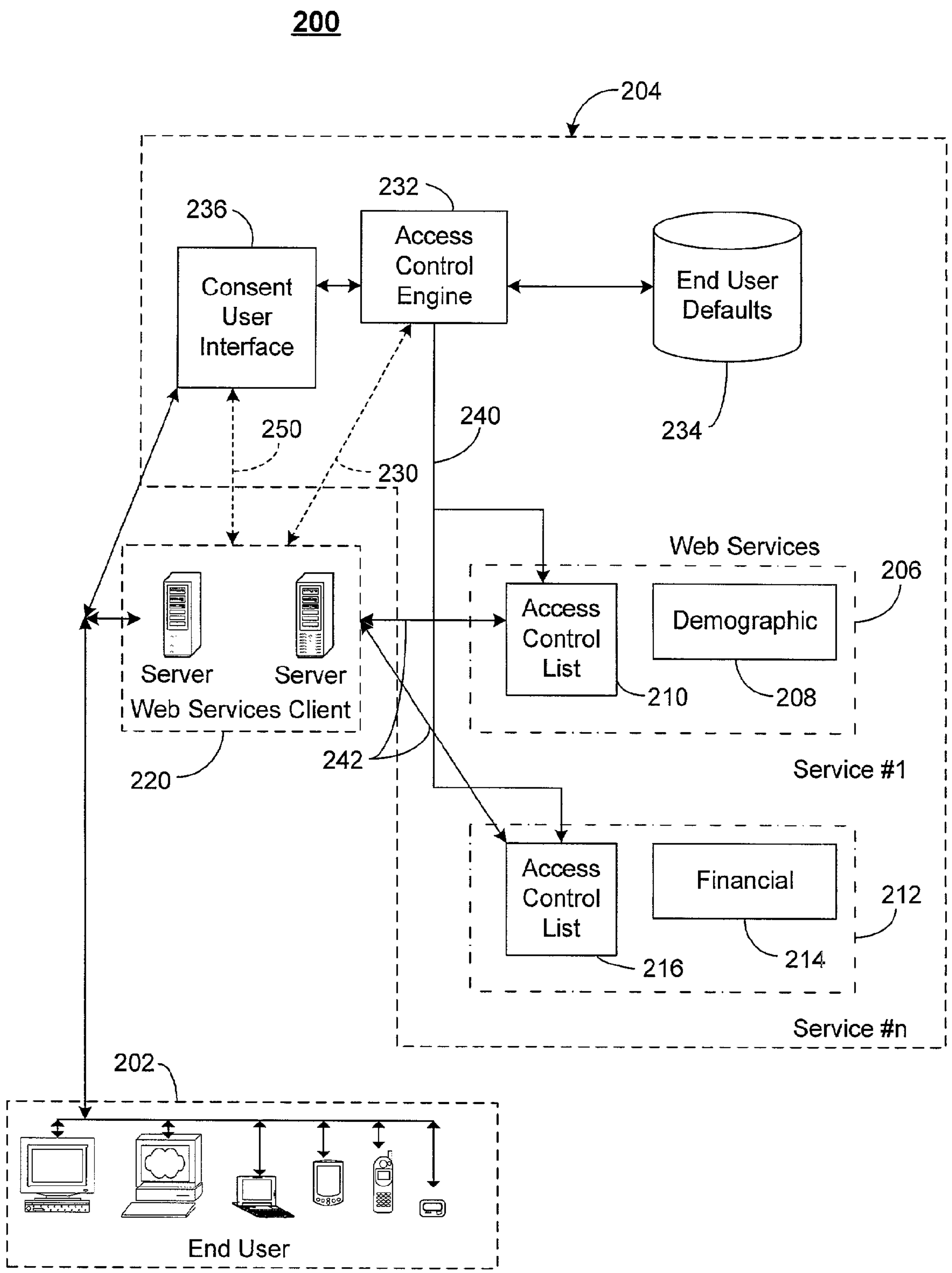
FIG. 2 is a block diagram of one embodiment of a network computing environment including a user-centric method and system for controlling access to user-specific information.

FIG. 2 is a block diagram of one embodiment of a network-computing environment 200, illustrating certain aspects of the invention. In particular, FIG. 2 illustrates aspects of one configuration of a system that allows an end user to control access to user-specific information in a data store maintained in connection with a web-services service. As illustrated therein, the network computing environment 200 may be functionally and structurally viewed as comprising three layers. One layer relates to an end user 202 (sometimes referred to herein as a web-services subscriber). The end user 202 accesses network-computing environment 200 by any of a number of network-compatible communication devices including, for example, desktop or portable computers, personal digital assistants, Internet appliances, mobile telephones and pagers having network communication capabilities, and so on. The network-compatible communication devices in the foregoing exemplary list are generally well-known in the art. It is expected, however, that end user 202 may also communicate in the network-computing environment with equipment heretofore unknown to the art.

A second layer generally relates to a web-services provider system 204. The web-services provider system 204 stores user-specific information associated with end user 202. For example, a first service may generally be referred to as a demographic service 206. Such demographic service 206 may include a data store 208 storing the end user's demographic information (e.g., age, gender, occupation, marital status, and the like). An access control list 210 is associated with the data store of demographic information 208. In a sense, the access control list 210 provides a gatekeeper function—it limits access to data store of demographic information 208 to specific parties and specific methods.

The web-services provider system 204 preferably provides a plurality of software-related services. FIG. 2 illustrates two services (demographic service 206 and financial service 212) for convenience; many other services are possible.

In the exemplary embodiment of FIG. 2, web-services provider system 204 also comprises an access control engine 232, a data store of default access preferences 234 associated with end user 202, and a consent user interface 236 (also referred to as a consent engine). The data store of default access preferences 234 identifies the end user's default access control instructions. In one embodiment, data store 234 defines the minimum attributes required of any client request to access any user-specific information. For example, a user's default preferences might allow read-only access to any user-specific information identified as public information for any client whose purpose is to post a targeted advertisement.

A third layer of network computing environment 200 relates to a client 220 (also referred to as a web-services client or a client system) that desires access to some of the user-specific information stored by the web-services provider. The term client is used broadly in this context. For example, the client system 220 can be an application (such as Microsoft "OFFICE" or "WORD"), a particular Internet destination such as MSN.COM ("MSN" is a trademark of the assignee), another end user of web-services provider 204, and so on. For convenience, FIG. 2 illustrates client system 220 as comprising a plurality of servers.

In general, when client system 220 seeks access to user-specific information, it sends an access request message to web-services provider system 204. For example, end user 202 may be visiting a web site associated with client system 220. Client system 220 may desire access to specific demographic information 208 regarding end user 202 to direct a targeted advertisement to user 202. As shown schematically by line 230 in FIG. 2, client system 220 sends an access request. The access request is operatively received by the access control engine 232 associated with web-services provider system 204. Access control engine 232 is illustrated and described in FIG. 2 as being an integral component of web-services provider system 204. It is to be understood, however, that the particular arrangement of FIG. 2 is provided to illustrate one possible embodiment. For example, access control engine 232 could be provided as part of a separate authorization service that provides access control services to a plurality of web-services providers.

The access control engine 232 preferably compares the obtained client system request with the end user's default access preferences 234. If an overlap exists, access is permitted. In other words, if the user's default access preferences 234 permit the type of access requested, access is authorized. Preferably, access control engine 232 determines whether to grant or deny access based on the end user default preferences 234, without interrupting the end user's task flow. This is referred to herein as a "silent negotiation."

If the user's default preferences permit access, access control engine 232 writes an appropriate access rule (see line 240) to the access control list (e.g., access control list 210) associated with the requested user-specific information. The access rule defines, for example, who may access the user-specific information, what type(s) of information may be accessed, the methods by which such access may be had, and/or a time limit on the access. Based on the request and the access rule, web-services client system 220 is permitted to access the user-specific information (symbolically reflected by lines 242). Note also that client system 220 preferably does not enjoy direct access privileges. Rather, access is made indirectly, via the web-services system. For example, each affected service (e.g., demographic service 206) completes the authorized access request for client system 220 and returns an appropriate response.

If access is denied—because end user default preferences 234 do not permit the access requested—client system 220 may seek to "renegotiate" the desired level of access. One way to renegotiate an access request involves directly presenting a request to end user 202. Although there are many possible ways to control and manage this option, the embodiment illustrated in FIG. 2 illustrates the following possibilities: (1) having web-services client system 220 send a request to access control engine 232 to invoke the consent engine 236 (via line 230); or (2) having web-services client system 220 directly call consent engine 236 (line 250).

According to one way of implementing the first option, client system 220 sends an appropriate message to web-services provider system 204 (preferably to access control engine 232) requesting that a consent menu be presented to end user 202. An exemplary consent menu is illustrated and described herein with respect to FIG. 3. Access control engine 232 (or other structure such as a consent engine associated with consent user interface 236) generates a list of options to present to user 202 in a consent menu format on a display associated with the end user's network communication device. In general, the consent options are determined from the client's access request. In one embodiment, the consent options are based on an "intention statement" (not shown in FIG. 2) associated with web-services client system 220. Preferably, the intention statement identifies the reason why web-services client system 220 desires access (e.g., to complete an on-line sale). The consent options also identify the type of information desired (e.g., demographic information 206), and/or the intended method of access (e.g., read only, read/write, and the like).

Thereafter, a consent menu is presented to user 202. The consent menu prompts user 202 to authorize or deny the client's access request. If user 202 authorizes the request, access control engine 232 writes an appropriate access rule (line 240) to the access control list associated with the particular user-specific information requested (e.g., access control list 210). If user 202 denies the request, access control engine 232 sends a message to web-services client system 220 denying the requested access.

As indicated above, in another embodiment, web-services client system 220 directly calls the consent user interface. This is illustrated in FIG. 2 by dashed line 250. This approach may be preferred because it would normally lead to a more consistent presentation to user 202, thereby increasing user confidence and acceptance of the consent system.

Based on the result of the renegotiation process, client system 220 is either permitted to access the desired information or prevented from accessing the desired information. In one embodiment, once client system 220 has failed to obtain access via silent negotiation or renegotiation, it is not permitted to request access again until other criteria have been met. For example, a time limit may be imposed.

A specific example is helpful to further identify several aspects of the invention that are illustrated in FIG. 2. In this example, an individual end user 202 accesses an auto repair shop's web site to check on the status of a repair. The repair shop's computer system is a web-services client 220. The repair shop system is configured such that it attempts to automatically update its customer service database to include the user's most recent personal information. In this example, the repair shop system would also like access to the user's financial information to allow it to bill the cost of the repair directly to the user's credit card.

The repair shop system 220 sends a message (e.g., to the web-services provider) seeking access to the user's demographic and financial information. The message includes an intention statement and indicates that: (1) the shop needs the identified user-specific information to complete the repair process; (2) it wants read only access to the user's demographic information; (3) it wants permission to share this demographic information with third parties if necessary to complete the car repair; (4) it wants to be able to access this information in the future to keep its database updated; (5) it wants read only access to the user's credit card information in the user's financial information; and (6) it will use the credit card information only to complete the present transaction and will not share it with third parties. It should be understood that the foregoing stated intentions are exemplary and that additional, fewer, and/or other intentions are contemplated within the scope of the present invention.

The access control engine 232 compares these stated intentions with the user's default access preferences 234. If the stated intentions are allowed by default access preferences 234, access control engine 232 automatically writes appropriate access rules to the access control lists 210, 216 associated with the user's demographic and financial information, and fills the repair shop's access request (line 242). This is an example of a "silent negotiation." Note that, although user 202 was not interrupted to complete this particular negotiation, the negotiation was completed only because the user's default preferences authorized the repair shop's requested level of access.

On the other hand, if the user's default preferences do not permit the repair shop to have the desired access, access control engine 232 returns an access denied message to the repair shop system. At this point, the repair shop system can choose to abandon its request or request that user 202 be presented with a consent menu in an attempt to renegotiate access. Based on the content of the intention statement, access control engine 232 (or a consent engine 236) compiles consent information to displayed to user 202. Preferably, such consent information is displayed in the form of an appropriate selection menu that prompts user 202 to accept or deny the access request. If user 202 grants the request, access control engine 232 writes appropriate access rules (line 240) to access control lists 210, 216, and the repair shop system is allowed to receive the desired user-specific information. If user 202 denies access, the repair shop is denied access.

It should be appreciated that a partial grant of access is also possible and contemplated within the scope of the present invention. In the foregoing example, user 202 might grant access to personal demographic information 208 but not to financial information 214. In such case, appropriate access rules are written and repair shop system must decide whether it wishes to proceed or not. It should likewise be appreciated that the foregoing example is provided for illustrative purposes only. The present invention may be practices in a wide variety of circumstances and is not limited to the examples described herein.

In summary, and referring still to FIG. 2, network computing environment 200 comprises web-services provider system 204 and a user 202 of a service offered by web-services provider system 204. Web-services provider system 204 preferably maintains one or more data stores of user-specific information (e.g., data store 208). In the exemplary embodiment illustrated, web-services provider system 204 also maintains a data store 234 that identifies the end user's default access preferences. On occasion, client system 220 requests access to one or more data stores of user-specific information. In such case, client system 220 transmits a request message that is operatively received by web-services provider system 204. Preferably, client system 220 indicates its intended use of the requested information if it is granted access. Access control engine 232, which is preferably associated with web-services provider system 204, obtains the client system's request. Access control engine 232 compares the client's intended use with the user's default access preferences to create an access control rule. For example, if the default preferences permit the intended use by the client, the created rule reflects a grant of access.

Figure 3:
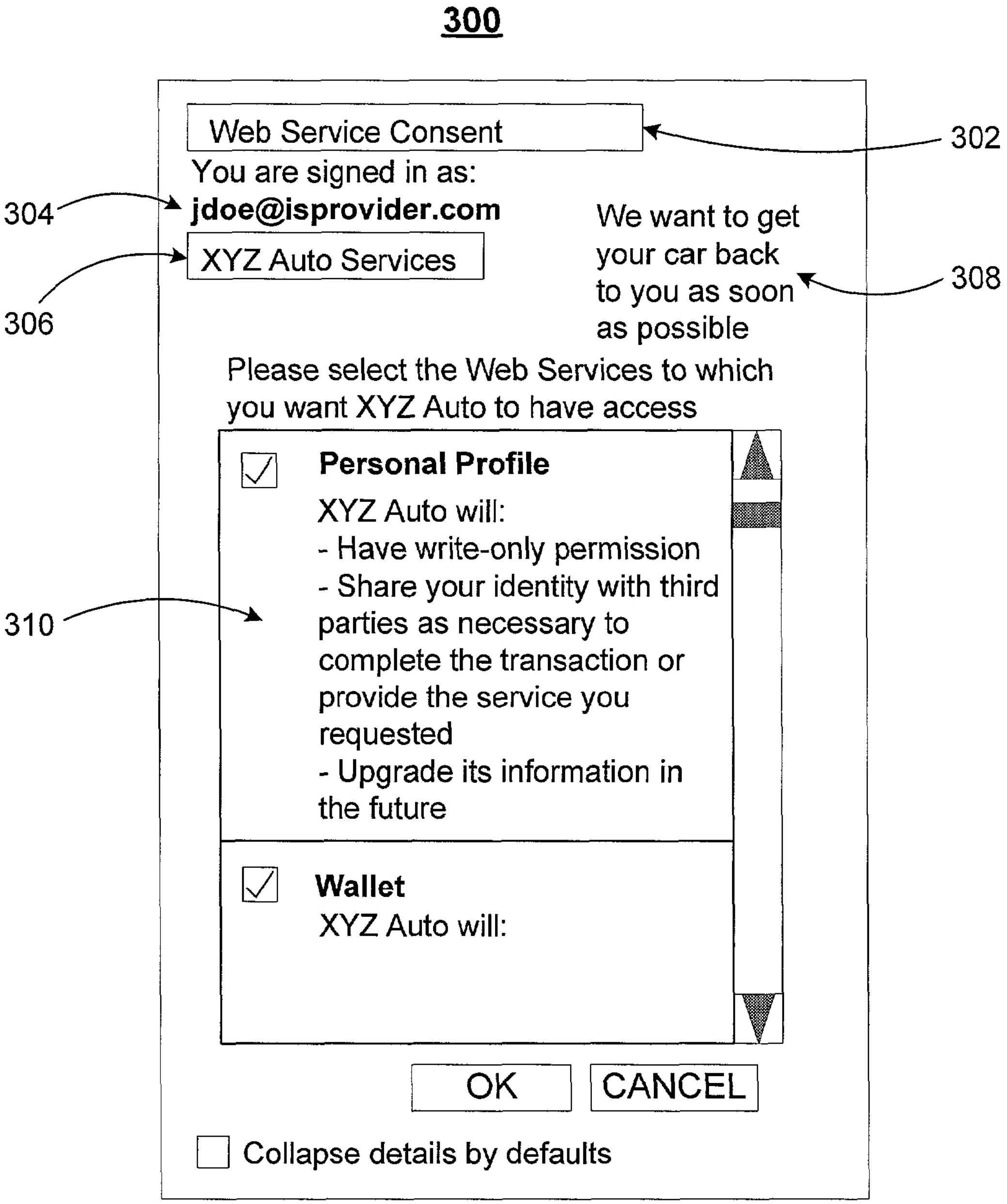
FIG. 3 is one embodiment of an exemplary consent menu for use connection with a user-centric method and system for controlling access to user-specific information.

FIG. 3 illustrates an exemplary consent menu displayed to an end user of a web-services service. FIG. 3 reflects one possible consent menu that could be generated in connection with a consent user interface such as, for example, consent user interface 236 of FIG. 2. FIG. 3 generally reflects the automobile repair shop example discussed in connection with FIG. 2. As illustrated in FIG. 3, a menu 300 is preferably identified as being a consent menu 302. The menu 300 identifies the user by an identifier 304 that is easily interpreted and understood by each of the parties involved in the consent transaction (i.e., the user, the web-services provider, and the web-services client). In the example shown in FIG. 3, the identifier 304 reflects the user's email address. It should be understood that a user can have various digital identities, any of which could be used in connection with the present invention. In a preferred embodiment, menu 300 also identifies the requesting client 306 (e.g., XYZ Auto Services).

The consent menu 300 also displays a value proposition 308 to the user. The value proposition 308 identifies why the user should consent to the client's access request. In FIG. 3, the value proposition 308 indicates that the repair shop (XYZ Auto Services) wants to return the user's car to the user as soon as possible. Consent menu 300 also includes one or more specific consent requests 310. These consent requests 310 preferably identify, in clear and consistent terms, the particular user-specific information to which the client desires access. In the example, the repair shop has requested access to the user's personal profile and financial information. Also, each request preferably identifies the intended method of access (e.g., read only access), whether and on what terms the client will share the user-specific information, and whether the client desires a "subscription" to the information. In this context, a subscription refers to an access right whereby the client is authorized access to information changes. By way of further example, in one form, any time user-specific information to which a subscription applies changes, the client receives an email or other digital message indicating as much. In another form, the client periodically checks for updates. In another form, each time the client seeks permission to access the user-specific information, assuming the subscription remains valid, the system provides the client with only information that has changed since the last access. Other forms of providing such a subscription capability are contemplated within the scope of the present invention.

In the example of FIG. 3, the user consents to the access request by marking the box associated with the particular request. After all of the options have been considered, the user accepts (OK) or terminates (CANCEL) the process to exit consent menu 300. Upon exiting the consent menu, a selection signal is transmitted by the user's network communication device, indicating that the user has completed the selection process.

Figure 4:
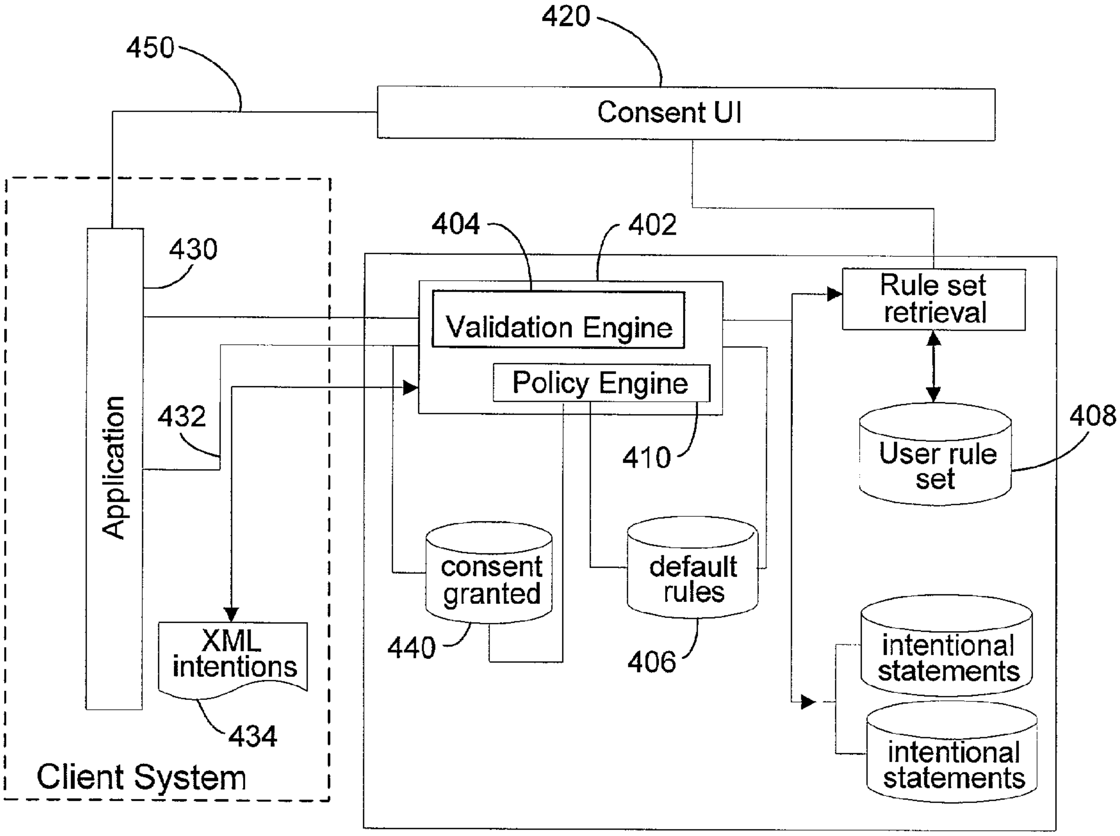
FIG. 4 is a functional schematic that illustrates aspects of one embodiment of an access control engine suitable for use in connection with a user-centric method and system for controlling access to user-specific information in a network computing environment.

FIG. 4 is a functional schematic that illustrates aspects of one embodiment of an access control engine 402 (sometimes referred to herein as a roleList engine) suitable for use in a network computing environment such as the environment 200 illustrated and described with respect to FIG. 2 (see access control engine 232). In particular, FIG. 4 illustrates an embodiment of an access control engine 402 that may be used to compare an access request by a client system against a set of user-approved default access preferences. As discussed above, such a capability is useful when an access control list does not currently include entries that permit the client to have the desired level of access. In other words, access control engine 402 is useful for facilitating a silent negotiation process.

In general, access control engine 402 comprises several components. For example, access control engine 402 preferably includes schema for: (1) defining the end user default rules; (2) identifying relationships between user identities (if a user has specified more than one identity); (3) managing a plurality of pending access requests; and (4) parsing the specific intentions of each requestor. Preferably, such schema are included as part of a validation engine 404.

Access control engine 402 also preferably interacts with a plurality of data stores. In the exemplary embodiment of FIG. 4, one data store 408 stores the end user's default access preferences/rules. Recall that a similar data store is illustrated as reference character 234 in FIG. 2. Another data store 406 stores additional default rules that may apply to groups or class of users. For example, in one embodiment, the default rules data store 406 includes rules associated with the Children's Online Privacy Protection Act of 1998 (COPPA). In general, the COPPA places limits on the ability to collect, use, or disclose personal information from children under the age of thirteen.

The access control engine 402 also comprises a policy engine 410 (also referred to as a logic engine). As will be described in greater detail below, the policy engine 410 determines whether a match exists between the client's desired level of access and the end user's default access rules. Access control engine 402 also includes one or more behaviors (not illustrated in FIG. 4) that control when a trusted consent user interface 420 may be invoked. Exemplary access control engine behaviors are described in connection with FIGS. 5-9. Finally, access control engine 402 preferably includes behaviors for writing an appropriate rule/role upon determining the level of access authorized by the user in an appropriate format.

Referring now to FIG. 4 in detail, a client application 420 indicates that it desires access to an end user's user-specific information by sending a digital request message 432 to access such information. More specifically, the request message (preferably a SOAP message) indicates which intentions apply to the current request and the method of access desired by the client. Access control engine 402 thereafter retrieves appropriate sections of the client's intentions document 434 (preferably in the form of an XML intentions document). By way of example, the intentions document 434 identifies the type of information desired and the client's purpose for requesting such information (i.e., how the client will use the information). At this point, therefore, access control engine 402 knows: (1) the user-specific information the client wants to access; (2) how the client will use the information; and (3) the method by which the client desires to access the information.

Based on the client's intentions and desired method of access, the validation engine 404 determines whether sufficient access permissions have already been granted for the intentions and method requested by the client for the particular service and end user. In the system reflected in FIG. 4, validation engine 404 compares the client's intentions and method with the user's existing permissions. If there is an exact match (i.e., the user has already permitted this client to access the requested information, for the requested purpose, by the requested method), then a success message is returned and the request is filled.

There are at least three circumstances in which validation engine 404 would fail to find a match and grant access. First, there may be no existing permission at all for the requesting client. Second, the user may have allowed some type of access for the particular client application 432, but the present intentions are not the same as those previously agreed upon. Finally, the method of access requested may exceed that which is presently allowed. If any of these failures occur, the policy engine 410 is invoked in an effort to determine if the user's default rule set permits the client to have the desired access. For example, the user's default rule set 408 may authorize any client to have read-only privileges to certain types of user-specific information. Thus, if the client seeks read-only access to such information, policy engine 410 should determine that the client's request may be filled. In such case, policy engine 410 provides validation engine 404 with the necessary parameters to write an appropriate access control rule. Validation engine 404 then composes an appropriate response message for client application 430.

If the defaults do not permit the client to access the user-specific information, policy engine 410 provides validation engine 404 with the necessary parameters to write a denial rule or, optionally, to invoke the consent user interface 420. In one embodiment, when the user's default rules do not permit the client's access request, validation engine 404 transmits a failure message to client application 430. Upon receiving such failure message, client application 430 can terminate its request or send a message invoking consent user interface 420 (line 450). One preferable consent user interface menu has already been described herein with respect to FIGS. 2 and 3. Other methods and systems for invoking a consent user interface are described in connection with FIGS. 5-9. It should be appreciated that invoking consent user interface 420 will normally interrupt the task flow of the end user.

As an optional form of optimization, a consent store 440 can also be included. The consent store 440 keeps track of whether access is granted or affirmatively denied by the user each time consent user interface 410 is invoked. It should be appreciated that such a store could be used in several ways. For example, in ambiguous situations, a policy engine 410 using an advanced logic capability (e.g., fuzzy logic) could refer to consent store 440 to reference how the user specifically responded to previous requests by the client.

Figure 5A:
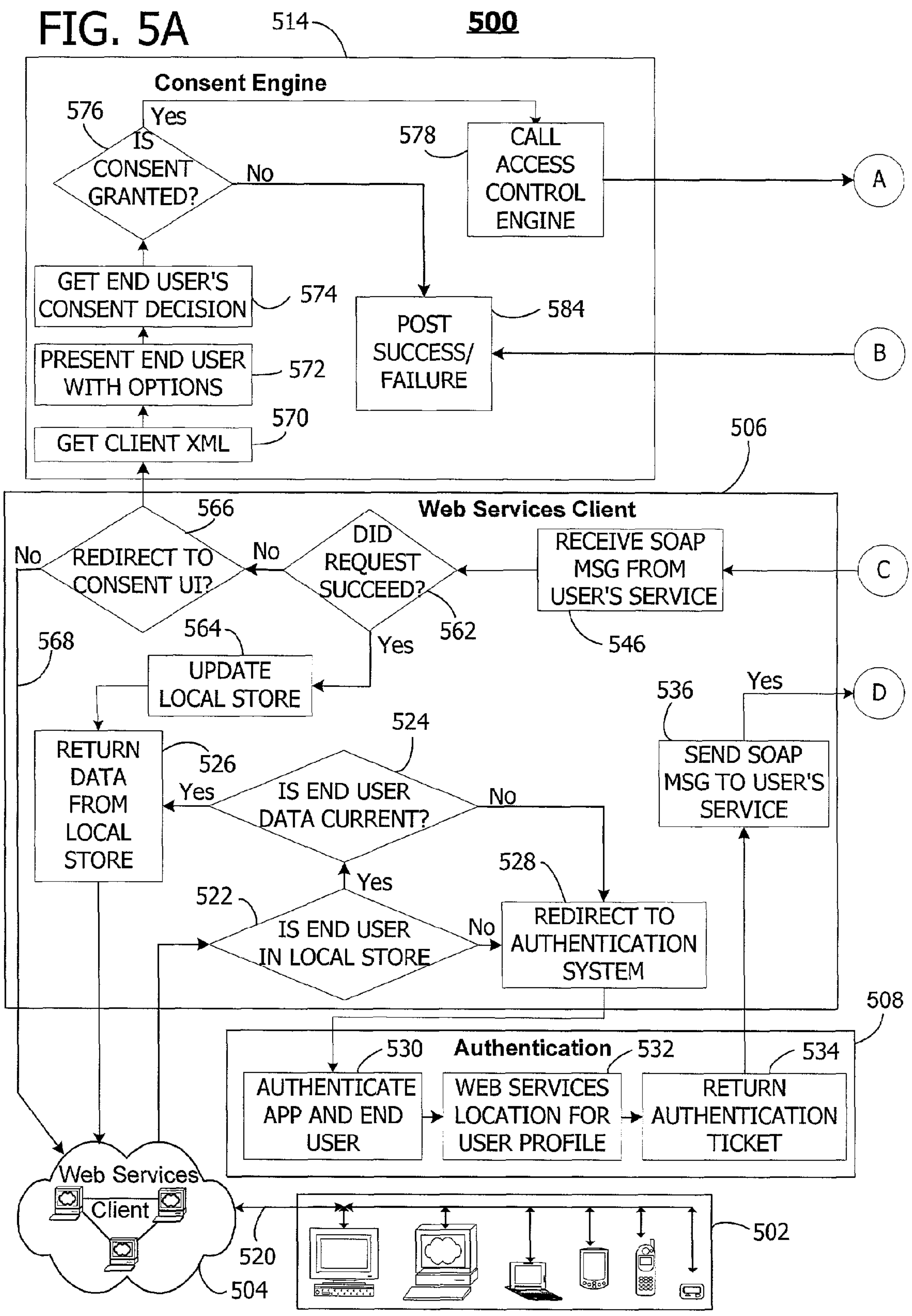
FIGS. 5A and 5B illustrate in flow diagram form aspects of one embodiment of a method and system for allowing an end user of a web-services service to control access to user-specific information stored in connection with the service.
Figure 5B:
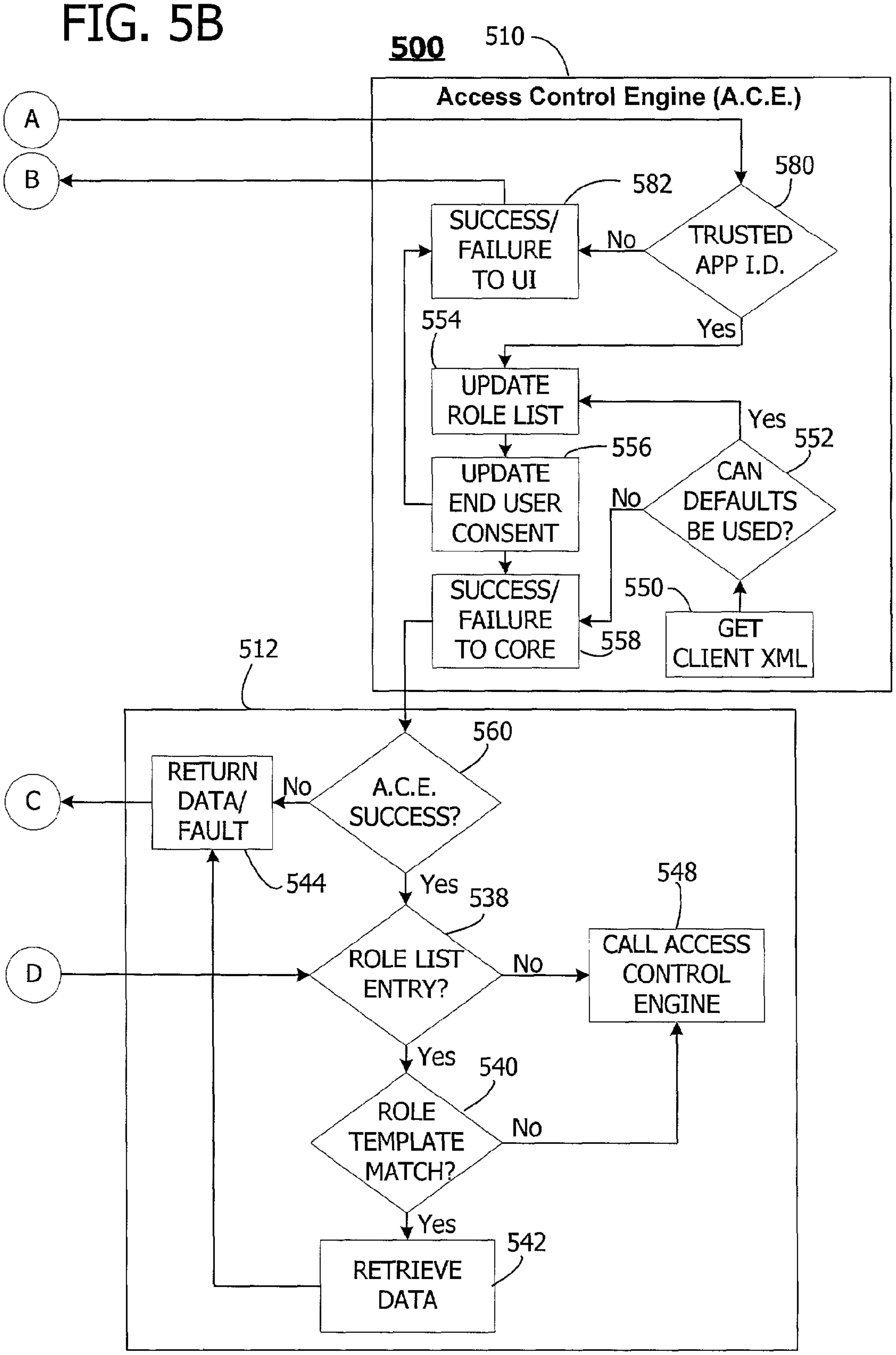

FIGS. 5A and 5B illustrate, in flow diagram form, a network computing environment 500 that includes a user-centric method of controlling access to user-specific information. More specifically, FIGS. 5A and 5B illustrate a method and system for allowing an end user of a web-services service to control who has access to user-specific information stored in connection with such service.

Broadly speaking, the environment 500 depicted in FIGS. 5A and 5B comprises: an end user 502 in digital communication with a web-services client system 504; a client-side authorization fabric 506 (also referred to as a client-side access control interface); an authentication system 508 (also referred to as an authentication engine); an access control engine 510 (also referred to as a roleList engine); a service-side authorization fabric 512 associated with a web-services service (also referred to as a service-side access control interface); and a consent engine 514 (also referred to as a consent user interface or consent U.I.).

As illustrated, the end user 502 preferably communicates with the web-services client system 504 using one or more network-compatible communication devices (e.g., a personal computer, a personal digital assistant, a pocket personal computer, a digital pager, a digital compatible portable telephone, an Internet appliance, or the like). The client-side authorization fabric 506 reflects the pertinent software and structures that are associated with client system 504. The service-side fabric 512 reflects the pertinent software and structures associated with the web-services service provider. The access control engine 510 and consent engine 514 also reflect software and structures preferably associated with the web-services provider. In one embodiment, the authentication system 508 is a separate, trusted service. One such authentication service is commercially available from the assignee of the present invention and is known in the art by the trademark PASSPORT. In another possible embodiment, authentication system 508 comprises a dedicated engine associated with the web-services provider system.

The method and system illustrated in FIGS. 5A and 5B will be further described by way of a general example. In operation, end user 502 communicates with web-services client 504 over a network communication channel 520. For example, if end user 502 is an individual and web-services client 504 is a web site, end user 502 might use his/her web browser to access the client's web site. As another example, if client 504 is device-oriented (e.g., a paging system that provides sports scores), it may initiate a call to the user's digital pager (a network communication device).

In order to complete a task requested by end user 502 or for other purposes, client system 504 desires (or needs) access to certain user-specific information. For example, if client 504 is financial web site that provides business information, it may need to know which stocks user 502 tracks so that it can display the latest prices of those stocks to user 502. As another example, client 504 may seek to present a targeted advertisement to user 502. In order to select an appropriate advertisement, client 504 may want to know certain demographic information regarding user 502 (e.g., age, gender, occupation, zip code, and so on). In still another example, client 504 may be an on-line retailer that needs access to address and credit information regarding user 502 to complete an agreed upon transaction.

At block 522, client-side fabric 506 first determines if any of the desired subject matter is available locally. If a local copy exists, client-side fabric 506 determines if that copy is current (block 524). For example, client-side fabric 506 may declare any information more than one-month old to be stale. If a local copy of the desired information is both available and current, client-side fabric 506 returns the local copy to the client system 504 and the process is complete (block 526). In such case, there is no need to request permission to access user-specific information stored with the web-services service.

If a local copy of the desired user-specific information does not exist or is not current, client-side fabric 506 proceeds to block 528 to begin the process of acquiring authorization to access the desired information in the data store associated with the web-services service. Preferably, and as illustrated in FIGS. 5A and 5B, client-side fabric 506 first redirects to authentication service 508. At blocks 530-534, authentication service 508 authenticates user 502, authenticates each of the services to which client system 504 desires to gain access, and returns authenticated tickets.

At block 536, upon receiving the necessary authenticated tickets, client-side fabric 506 sends an access request message that is received by service-side fabric 512. As illustrated in FIGS. 5A and 5B, all communications between client-side fabric 506 and service-side fabric 512 are preferably conducted using SOAP messages. Such access request message preferably identifies the client's intentions (e.g., the type of user-specific information requested and how the client will use the information) and a requested method of access.

At block 538, service-side fabric 512 compares the client's request with the existing access control list (referred to in FIGS. 5A and 5B as a roleList) to determine whether the user has already granted or denied the client's request. More particularly, in the embodiment illustrated in FIGS. 5A and 5B, service-side fabric 512 searches the access control list for a subject match. As used here, the "subject" may be viewed as a key into a role. In the embodiment of FIGS. 5A and 5B, the subject preferably comprises a user ID, an application ID, and a credential type (e.g., password, personal identification number, and so on). If there is a subject match, then the rest of the request is used to determine whether and what information is returned.

If a subject match is found, service-side fabric 512 proceeds to block 540. At block 540, service-side fabric 512 compares the client's requested method of access (e.g., query) against a list of user-allowed methods (referred to in FIGS. 5A and 5B as a roleTemplate match) identified in the access control list. If the access control list indicates that the user will permit the requested method, service-side fabric 512 fills the client's request and sends a return SOAP message to client-side fabric 506 (see blocks 542-546). The following is an exemplary logic flow for the foregoing request process:

Is there a role where the subject=userID and appID and credType for the incoming request? (If no, stop processing);

Is the method requested (e.g., query) included in the roleTemplate for this role? (If no, stop processing);

Apply filters (scopes) associated with the role as part of the information retrieval process;

Return the result.

If a match is not found at block 538 (no subject match) or at block 540 (no method match), service-side fabric 512 proceeds to block 548 and calls access control engine 510. At block 550, access control engine 510 obtains a copy of the client intentions document (referred to in FIGS. 5A and 5B as Client XML). In the embodiment illustrated in FIGS. 5A and 5B, the Client XML is preferably stored in an <EXTENSION> section of a P3P XML document which would be passed as part of the SOAP message body. At block 552, access control engine 510 parses the client intentions document for the specific service(s) and user-specific information associated with the client's access request. Also at block 552, access control engine 510 determines the client's proposed method of access and intentions and compares those to the user's default access preferences. At a relatively broad level, these default access preferences generally reflect the authority that the user is willing to give to any web-services client. Such default access preferences may also reflect default permissions associated with particular services, particular types of user-specific information, particular clients, and so on. If a match is found at block 552, access control engine 510 proceeds to block 554 and writes appropriate access control rules (also called roles) to the access control lists associated with the data stores corresponding to the client's request. At block 556, access control engine 510 preferably stores the determined intentions in a data store for subsequent use. At block 558, access control engine 510 returns a success message to service-side fabric 512. If, at block 552, the end user defaults do not match with the client's intentions and proposed method of access, access control engine 510 posts a failure message to service-side fabric 512 at block 558.

At block 560, service-side fabric 512 receives the success or failure message from access control engine 510. If a success message is received, service-side fabric 512 proceeds along the success path discussed above (block 538 to block 540 to block 542 to block 544) and the service fills the client's request. If a failure message is received at block 560, service-side fabric 512 proceeds along the failure path discussed above (block 544 to block 546).

At block 562, client-side fabric 506 determines whether the SOAP message received at block 546 reflects a success or failure. If the SOAP message indicates a success (access granted and request filled), client-side fabric 506 preferably proceeds to block 564 and stores the retrieved user-specific information in a local data store and returns the information (block 526) to client system 504, thereby completing a successful access request. It should be understood that some client systems may choose not to maintain a local data store. It should also be noted that, to this point, the access request process did not interrupt end user 502.

If, at block 562, client-side fabric 506 determines that the received SOAP message indicates a failure, client-side fabric proceeds to block 566. Block 566 reflects a "renegotiation" decision block. In other words, if the client system's access request was not successfully resolved without interrupting end user 502, client-side fabric 506 may be constructed and arranged to attempt to renegotiate the desired level of access by invoking consent engine 514. For example, client-side fabric 506 may be programmed so that it calls consent engine 514 only when client system 504 requests certain types of critical information (e.g., information necessary to complete a primary task initiated by user 502). In another example, client-side fabric 506 may be programmed to call consent engine 514 only one time per client system request. There are, of course, many other criteria that could be used by client-side fabric 506 to determine whether to invoke consent engine 514. If, at block 566, client-side fabric 506 declines to invoke consent engine 514, a failure is returned to client system 504 (see line 568), thereby completing an unsuccessful access request cycle.

If client-side fabric 506 invokes consent engine 514 at block 566, the process proceeds to block 570. At block 570, consent engine 514 retrieves a copy of the client intentions document (referred to in FIGS. 5A and 5B as Client XML) and parses the document for the specific service(s) and user-specific information associated with the client's access request. This aspect of the process is similar to block 550 (which is associated with access control engine 510). Based on the content of the client's intentions document, consent engine 514 generates an consent option list and presents a consent option list menu to user 502 on the user's network computing device (blocks 572, 574). One form of a suitable option menu has been described in connection with FIG. 3.

Referring still to FIGS. 5A and 5B, if user 502 consents to the access request reflected in the option menu (block 576), consent engine 514 proceeds to block 578 and invokes access control engine 510. In particular, consent engine 514 sends an "insert" request to access control engine 510, requesting that a role be written. The insert request preferably identifies the subject, roleTemplate (method), and scope.

Before completing the insert request, access control engine 510 first checks the application identifier of consent engine 510. In particular, access control engine 510 preferably determines whether consent engine 514 has a trusted identifier. This is reflected in FIGS. 5A and 5B at block 580. If consent engine 514 provides a trusted application identifier, access control engine 510 proceeds along a success path to block 554. In particular, access control engine 510 writes appropriate access control rules to the access control lists associated with the data stores corresponding to the client request. Access control engine 510 thereafter proceeds to block 556 where it may store the determined intentions in a data store for subsequent use. One such possible use has been discussed in connection with FIG. 4 herein (see reference character 440). At this point, access control engine 510 is preferably configured such that it knows it has been invoked by consent engine 514 (as opposed to service-side fabric 512) and proceeds to block 582 where it posts a success message to consent engine 514 (block 584). In one embodiment (not illustrated), consent engine 514 also causes a success message to be displayed to user 502.

Access control engine 510 thereafter proceeds to block 558 where it posts a success message to service-side fabric 512. Upon receiving a success message at block 560, service-side fabric 512 proceeds along the success path (block 538 to block 540 to block 542) and retrieves the user-specific information corresponding to the successful access request. At block 544, service-side fabric 512 returns the information to client-side fabric 506, preferably using a SOAP message. At this point, client-side fabric 506 also proceeds along the success path (block 546 to block 562 to block 564 to block 526) to fill the request of client system 504.

If, at block 580, consent engine 514 does not provide a trusted application identifier, access control engine 510 proceeds to block 582 and posts a failure message to consent engine 514. Thereafter, at block 584, consent engine 510 returns a fault message to client-side fabric 506.

The method and system for controlling access to user-specific information illustrated in FIGS. 5A and 5B provides several advantages. For example, if access control engine 510 determines that user 502 has agreed to default permissions that authorize client system 504 to have the desired access, access control engine 510 can conduct a silent negotiation and return the requested user-specific information without invoking consent engine 514 and without interrupting user 502. Also, the client (via client-side fabric 506) controls when and under what conditions to invoke consent engine 514 to attempt to "renegotiate" access directly with user 502.

The method and architecture illustrated in FIGS. 5A and 5B also provides for flexible intentions agreement management. In this regard, intentions agreement management generally refers to the process for determining whether user 502 has authorized the access request of client system 504. For example, in the embodiment illustrated in FIG. 2, the entire access control list for each service is stored in connection with that service. With the method and architecture of FIGS. 5A and 5B, all or part of each access control list may be incorporated into a single access control engine (e.g., access control engine 510) without a significant impact on the system architecture. Intentions management can also be improved by adding a section pointer in the client intentions document to the SOAP message. This is unlike standard P3P, in which a client would have to declare all of their intentions as soon as the end user comes to the client site, or create multiple verbose statements (or the like) and link them to specific points in the client site. Such approaches may present more information than is necessary and may lead to user confusion. Such approaches may also be unacceptable from a client's perspective, unless the client were able to develop or use a heretofore unknown in the art user agent or consent engine that would effectively expose P3P to end users.

In the embodiment of FIGS. 5A and 5B, on the other hand, it is possible to declare intentions to end users at a more logical time. In other words, if the client does not need to access user-specific information to complete a task, then there is no need to declare any intentions. For example, with standard P3P, a website may declare that it collects user-specific financial information in order to complete current activities. In reality, that site may only collect such information when the user visits a particular financial section of the site. Thus, some users may opt to avoid the entire website, believing that the entire site requires the user to provide user-specific financial information. With the embodiment of FIGS. 5A and 5B, however, it is possible to avoid this type of confusion by declaring the client's intentions only when the client will actually request the user-specific information.

As already indicated, client-side fabric 506 and service-side fabric 512 preferably communicate using SOAP messages. In one embodiment, such messages use the <EXTENSION> mechanism of a standard P3P verbose XML policy to express any required elements. Such information within the client intentions document (illustrated in FIGS. 5A and 5B as client XML) could be used by the consent engine (e.g., consent engine 514), as well as part of a silent negotiation and for any intentions updates (see blocks 550 and 570). The following is an exemplary XML document schema:

```
<EXTENSION>
  <intentionSet name= version=/>
  <consentUI location="URI"/>
  <section ID=>
      <valueProp></valueProp>
      <services>
          <service name="serviceName" roleTemplateRef="GUID"
subscription="True/False">
          <intentions>
          <intention></intention>
          <intention></intention>
        </intentions>
        <dataElements>
            <dataElement></dataElement>
```

-continued

```
          </dataElements>
        </service>
      </services>
    </section>
</EXTENSION>
```

In summary, FIGS. 5A and 5B illustrate a network computing environment 500 suitable for use in connection with a web-services provider that provides a software service. The web-services provider maintains a data store of user-specific information (see FIG. 2) associated with a user 502 of one or more of the software services. In order to complete a task, a client system 504 desires access to user-specific information in the data store. Such a client system may be, for example, another web-services user, a web site, a device-oriented service provider (e.g., a paging service that provides periodic stock market information), or the like. The client system preferably includes a client-side fabric 506 that is constructed and arranged to provide certain interfaces and structures for communicating within network computing environment 500. FIGS. 5A and 5B illustrate, among other things, a user-centric method and system for controlling access to the user-specific information in the data store. When client system 504 desires access to such user-specific information, it first checks a local data store to see if the desired information is present and current (blocks 522, 524, 526). If a local copy is available and current, client system 504 uses that data. If local a local copy is unavailable or not current, the client sends an access request message that is, preferably, directed to the software service(s) associated with the desired information. In FIGS. 5A and 5B, this aspect of the method is reflected at step 536. Preferably, the access request message identifies the subject matter and method of access desired by the client. The access request is then compared to an access control list associated with the affected software service to determine if the request is within the existing access control rules reflected in the access control list. In other words, a comparison is done to determine if user 502 has already authorized the form of access requested by client 504. This aspect of the method and system is reflected by blocks 538 and 540 in FIGS. 5A and 5B. If the existing access control rules permit the client's access request, the client is authorized to access the requested information in the data store (e.g., the desired information is gathered and transmitted to the client), as reflected by block 542.

If the access control list indicates that user 502 has not authorized client 504 to enjoy the desired form of access, access control engine 510 is called (block 548). Preferably, and as illustrated in FIGS. 5A and 5B, access control engine 510 determines an intended use of the information by client 504 (block 550). Based on this determined, intended use, access control engine 510 thereafter determines if user 502 has provided a default set of access control rules/instructions that permit client 504 to have the access desired (block 552). If the user's default set of access control rules permit client 504 to access the desired user-specific information, access control engine 510 preferably updates the access control list to permit client 504 to access that information (see, for example, blocks 554, 556, and 558). If, however, the user's default set of access control rules do not permit client 504 to have the desired access, access control engine 510 preferably returns a fault response (block 558). Upon receiving a fault response, client 504 may optionally choose to terminate the request or to invoke consent engine 514 in an effort to renegotiate the desired level of access directly with user 502. Consent engine 514 preferably presents user 502 with a consent menu (e.g., of the form illustrated and described with regard to FIG. 3) on the user's network communication device. If user 502 consents to the access request, consent engine 514 preferably invokes access control engine 510, which thereafter updates the access control list to reflect that user 502 has granted the necessary permissions to client 504. If user 502 does not consent to the client's access request, consent engine 514 posts a failure message to client 504.

Figure 6:
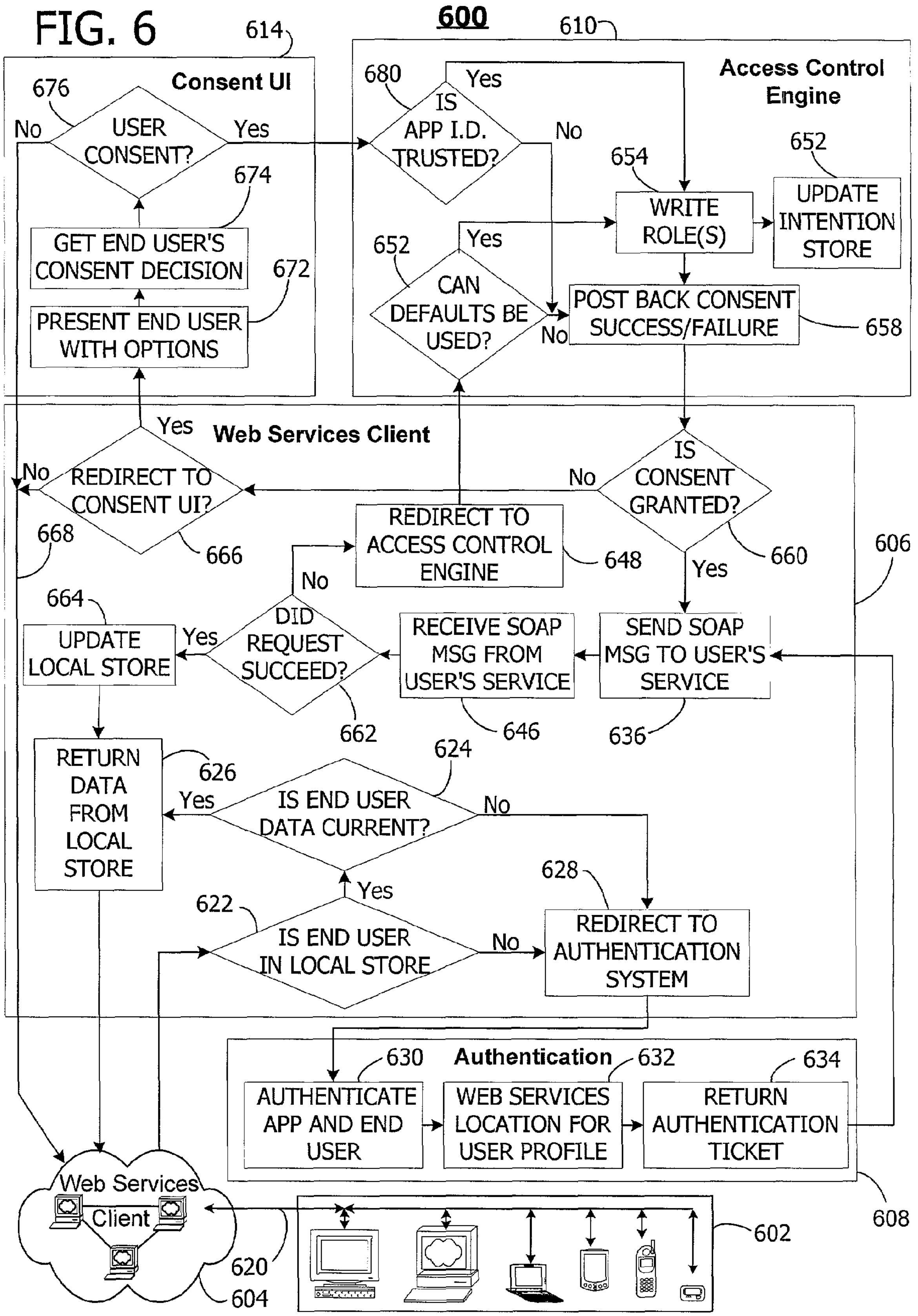
FIG. 6 is a flow diagram of aspects of another embodiment of a method and system for allowing an end user of a web-services service to control access to user-specific information stored in connection with the service.
Figure 7:
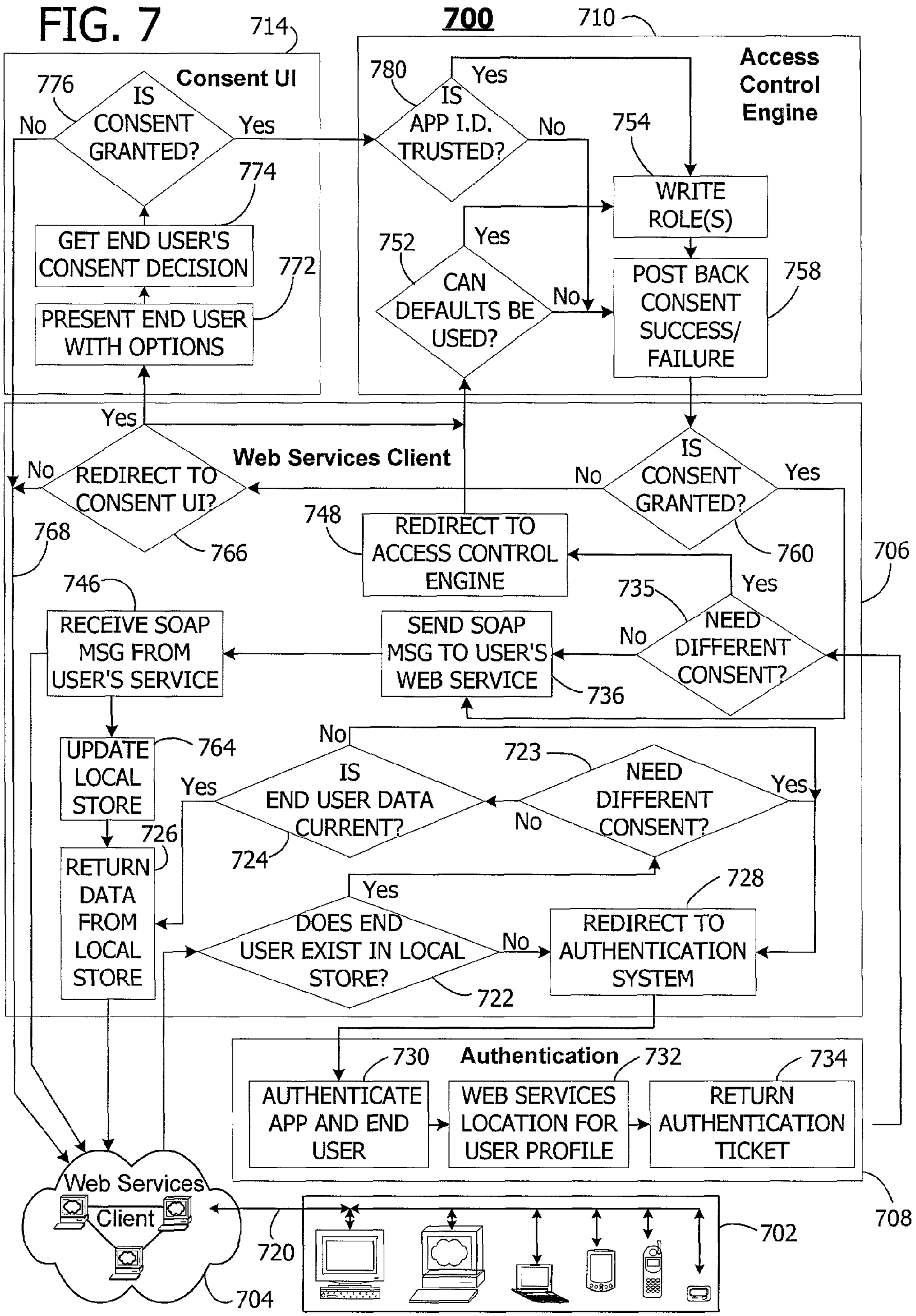
FIG. 7 is a flow diagram of aspects of another embodiment of a method and system for allowing an end user of a web-services service to control access to user-specific information stored in connection with the service.
Figure 8:
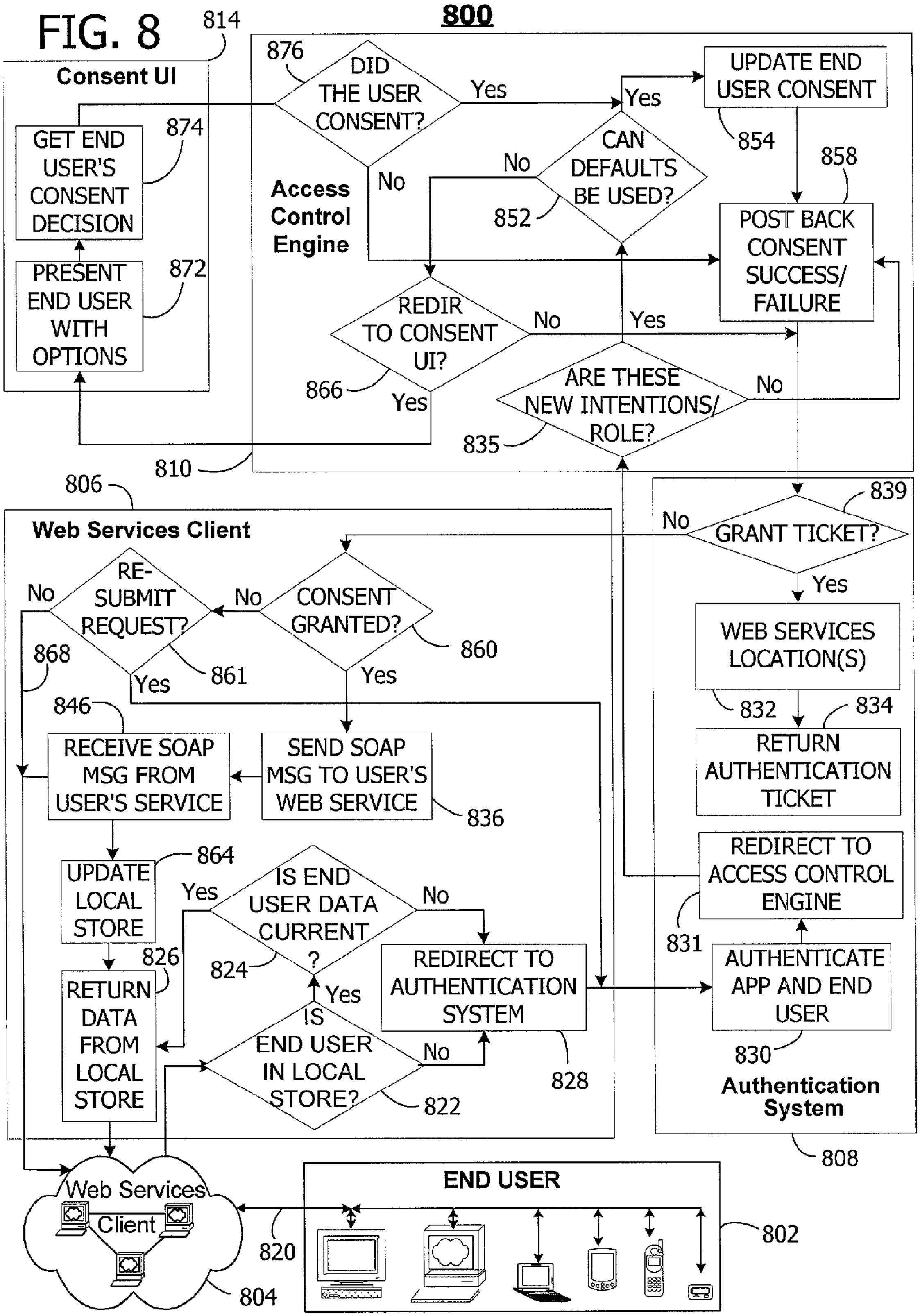
FIG. 8 is a flow diagram of aspects of another embodiment of a method and system for allowing an end user of a web-services service to control access to user-specific information stored in connection with the service.
Figure 9:
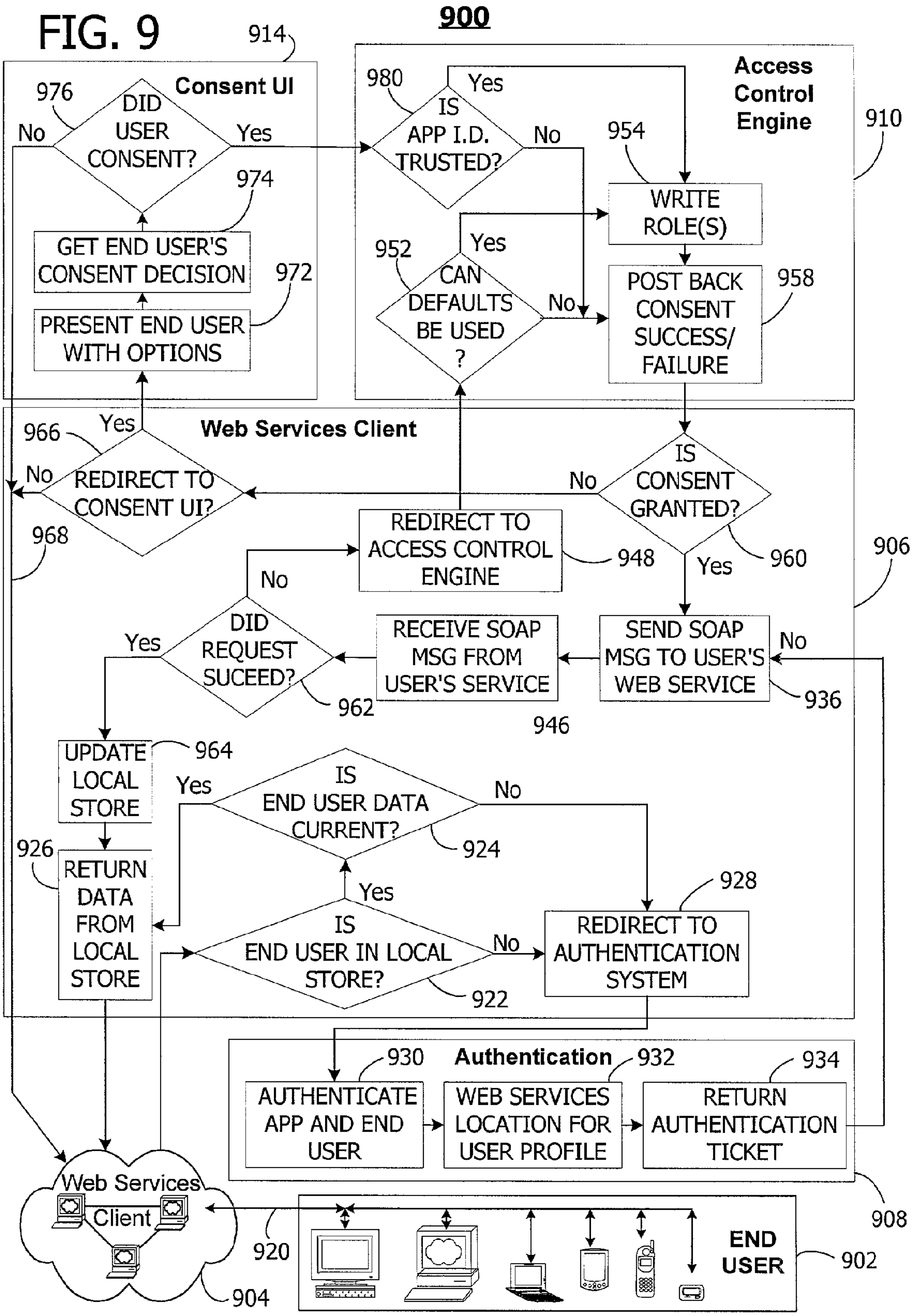
FIG. 9 is a flow diagram of aspects of another embodiment of a method and system for allowing an end user of a web-services service to control access to user-specific information stored in connection with the service.

FIGS. 6-9 illustrate, in flow diagram form, alternative methods and structures to the method and system illustrated in FIGS. 5A and 5B. More specifically, FIG. 6 illustrates one embodiment of a system in a network computing environment in which there is no overall management of the intentions agreement process. FIG. 7 illustrates an embodiment in which the web-services client manages the intentions agreement process. FIG. 8 illustrates another embodiment in which an access control engine manages the intentions agreement process. Finally, FIG. 9 illustrates an embodiment in which each web-services service manages the intentions agreement process. In general, FIGS. 6-9 illustrate several components similar to components illustrated and described in connection with FIGS. 5A and 5B.

Before describing FIGS. 6-9, it should be noted that it may be desirable to include the access control engine and the consent engine in the same code base. It may be further desirable for each engine to be called independently of the other. Accordingly, even though some of the figures herein show an access control engine being called first, and thereafter (optionally) calling a consent engine (i.e., a redirect to a consent engine URL), it is also possible to first redirect to the consent engine and have the consent engine call the access control engine, as appropriate. It should further be noted that some web-based client systems (e.g., client web sites, Internet service providers, and the like) may conclude that it is less costly to redirect to the consent engine first. On the other hand, some device-based client systems (e.g., digital paging systems and so on) may conclude that it is more desirable to call the access control engine directly and, thereafter, determine whether or not to invoke the consent engine (this is generally illustrated in FIGS. 5A and 5B).

FIG. 6 illustrates a network computing environment 600 in which there is no centralized intentions management. Environment 600 preferably comprises an end user 602 in digital communication with a client system 604. Also included is a client-side authorization fabric 606, an authentication system 608, an access control engine 610, and a consent engine 614. Preferably, the access control engine 610 and the consent engine 614 are associated with a web-services provider that provides a service (e.g., a software service) to user 602.

In operation, user 602 enters into a network communication connection 620 with client system 604. If client system 604 desires user-specific information, it first seeks such information from a local data store (blocks 622, 624, 626). If a local copy of the desired information is either not available or not current (e.g., it is old or incomplete), client-side fabric 606 preferably redirects the process to the authentication system 608 (block 628). At blocks 630-634, authentication system 608 attempts to authenticate the digital identity of client system 604 and the affected services. Authentication system 608 preferably returns authenticated tickets for user 602 and any service that is to be accessed.

Upon receiving the authenticated tickets, client-side fabric 606 sends an access request message to each of the services for which client system 604 desires access (block 636). In response to the access request, each service evaluates the SOAP message to determine if user 602 has already granted the requested access to client system 604. More particularly, each service compares the client request to an associated access control list to determine if client system 604 is already authorized to access the requested user-specific information by the proposed method. If access is authorized, each affected service preferably fills the request and returns the information in a response message (block 646). Thereafter, client-side fabric 606 proceeds on a success path identified by blocks 662, 664, and 626.

If the access control list does not authorize client 604 to have the desired access (e.g., client 604 is not on the access list, the method of access requested is has not been allowed, or the particular user-specific information requested has not been made accessible to client 604), the affected service returns an error message at block 646. Upon receiving this error message, client-side fabric 606 proceeds along an initial failure path (block 662 to block 648). At block 648, client-side fabric 606 calls access control engine 610. At block 652, access control engine 610 compares the client's access request to a set of user default preferences. If the client's request falls within the bounds of the user's default preferences, access control engine 610 updates the affected access control lists to reflect the grant of access (block 654), updates a local data store of intentions (block 652), and returns a success message to client-side fabric 606 (block 658). This is a form of silent negotiation. The intention store of the embodiment illustrated in FIG. 6 is functionally similar to block 556 of FIGS. 5A and 5B. In the embodiment of FIG. 6, however, there is no intentions management; the intentions associated with consent are simply logged.

As illustrated in FIG. 6, when client-side fabric 606 receives a success message at block 660, client side fabric 606 again sends a request message to the affected services (block 636) and the process repeats. In this iteration, however, the access control lists have been updated. Therefore, the SOAP messages received from the affected services at block 646 should indicate a success and the information request should be filled (blocks 662, 664, 626).

If, at block 652, access control engine 610 determines that the default preferences of user 602 do not authorize client system 604 to gain access to the user-specific information, access control engine 610 proceeds to block 658 and posts a failure message to client-side fabric 606. Upon receiving this failure message, client-side fabric 606 optionally calls consent engine 614 in an attempt to renegotiate access to the desired information. Preferably, service-side fabric 606 provides consent engine 614 with a copy of the client's intentions document (in XML format) and identifies the services to which client 604 desires access (e.g., provides service IDs).

Based on the client's desired access, consent engine 614 prepares a list of consent options which are preferable presented to user 602 on his/her network communication device (blocks 672-674). If user 602 authorizes access, consent engine 614 returns a success message to access control engine 610 (block 676). At block 680, access control engine 610 verifies that consent engine 614 is a trusted application. If consent engine 614 is trusted, access control engine 610 proceeds on a success path (blocks 654, 652) and returns a success message to client-side fabric 606 (block 658). If consent engine 614 is not trusted, access control engine 610 posts a failure to client-side fabric 660. If client-side fabric 606 receives a success message, it proceeds along a success path in the same manner as described above. If it receives a failure message, it may attempt another renegotiation with user 602 or return a failure to client system 604 (line 668). Preferably, client-side-fabric 606 is not permitted to repeatedly invoke consent engine 614 upon being denied authorization to access the user-specific information.

Among the advantages of the system and method illustrated in FIG. 6 is that consent engine 614 preferably interrupts user 602 only when necessary. On the other hand, if each affected service responds at a different time (see block 646), additional steps may be needed so that consent engine 614 does not present user 602 with a "choppy" experience. One possible resolution is for client-side fabric 606 to include a queuing system (not illustrated). In one such queuing system, for example, client-side fabric 606 awaits responses from all affected services (at block 646) and, thereafter, sends a single request to access control engine 610 and/or consent engine 614.

FIG. 7 illustrates a network computing environment 700 in which the web-services client provides the necessary intentions management control. Environment 700 preferably comprises an end user 702 in digital communications with a client system 704. Also included is a client-side authorization fabric 706, an authentication system 708, an access control engine 710, and a consent engine 714. Preferably, the access control engine 710 and the consent engine 714 are associated with a web-services provider which provides a software service to the end user 702.

In operation, end user 702 and client system 704 are in communication via a communication channel identified by line 720. As illustrated herein, user 702 may communicate with client system 704 using one of many possible network communication devices. In order to complete a task, client system 704 desires certain user-specific information regarding user 702. At block 722, client-side fabric 722 first determines whether the desired information already exists in a local data store. If a local copy is available, client-side fabric 722 determines whether client 704 is authorized to use the local copy (block 723). For example, even if a local copy of the desired information exists, it is possible that user 702 has not granted client system 704 access rights to that information for the client's current purpose. In other words, if the current intentions of client system 704 are beyond those for which user 704 has already authorized access, client system 704 will still require authorization to access the desired information. Similarly, if the method by which client system 704 desires to access the user-specific information exceeds that which user 702 has previously allowed, client system 704 must obtain authorization to access the desired information. Block 723 is included in FIG. 7 because that embodiment reflects a system and method in which intentions management occurs primarily on the client-side. Finally, if a local copy exists and client system 704 is authorized to use the local copy, client-side fabric 706 determines whether the local copy is current before returning the requested user-specific information to client system 704 (blocks 724, 726).

If a local copy is not available (e.g., because no such copy exists, client system 704 is not authorized to use the local copy, or the local copy is not current), client-side fabric 706 redirects to the authentication system 708. Authentication system 708 preferably returns any required authenticated tickets for user 702 and each service affected by the client's request (blocks 730, 732, 734).

Upon receiving any necessary authenticated tickets, client-side fabric 706 determines whether it must still obtain authorization (consent) before obtaining the desired user-specific information from the affected service (block 735). If client-side fabric 706 determines that client system 704 is authorized to access the desired information (e.g., the client's intentions and requested method have already been authorized by user 702), client-side fabric 706 sends a request message (block 736) to each affected service. Each affected service thereafter responds (block 746) by either filling or denying the request. If the request is filled, client-side fabric 706 proceeds along a success path identified by blocks 764 and 726. If the request is denied at block 746, a failure is returned (line 769).

If, at block 735, client-side fabric 706 determines that client system 704 is not currently authorized to access the desired information, client-side fabric 706 redirects to the access control engine 710 (block 748). Access control engine 710 attempts to match the client's intentions and requested method for each affected service against the user's default authorization preferences (block 752). If the defaults can be used for all of the client's requests, access control engine 710 updates the affected access control lists (block 754) and posts a success message to client-side fabric 706 (block 758). If the defaults can be used for some, but not all, of the client's requests, access control engine 710 returns a success only for those services for which the defaults permit client system 704 to have access.

For each successful access request (authorization/consent granted at block 760), client-side fabric 706 preferably proceeds along a success path identified by blocks 760, 736, 746, 764, and 726. For each unsuccessful access request, client-side fabric 706 has the option of giving up or calling the consent engine 714 (see block 766). Consent engine 714 preferably presents a list of consent options to user 702 on the user's network communication device (block 772). These options may be presented in a form similar to that illustrated and described with respect to FIG. 3. In other words, user 702 is presented with a menu that identifies: (1) client system 704 as the requestor; (2) a value proposition; (3) the service(s) and intentions for which client system 704 now seeks authorization; (4) the method of access desired; and, optionally, (5) whether to persist permissions (e.g., whether client system 704 is to be granted subscription rights).

If user 702 grants permission (blocks 774, 776), consent engine 714 redirects to access control engine 710. If user 702 does not grant permission, consent engine 714 returns a failure to client system 704 (see line 768). When invoked by consent engine 714, access control engine 710 first determines whether consent engine 714 is a trusted application (block 780). If consent engine 714 is not trusted, access control engine 710 returns a failure at block 758. If consent engine 714 is trusted, access control engine 710 updates each affected access control list and returns a success message to client-side fabric 706 (see blocks 754, 758). If client-side fabric 706 receives a success message, it proceeds along the success path previously discussed. If client-side fabric 706 receives a failure message, it calls consent engine 714 again or terminates (block 766). Preferably, client-side fabric 706 is configured such that it only makes a limited number of attempts to obtain consent via consent engine 714. This should minimize the inconvenience to user 702.

One of the advantages of the method and system illustrated in FIG. 7 is that the burden of managing intentions rests with each web-services client. Stated differently, the method and system of FIG. 7 places no additional burdens on the authorization and authentication mechanisms used by the web-services provider. Likewise, a separate service-side fabric is not required. Further, in the embodiment of FIG. 7, if client system 704 has a local copy of the desired information and already has permission to use that local copy, there is no need for server-to-server calls to authentication tickets or to access the affected services. Further, in the embodiment of FIG. 7, a SOAP message is posted to the affected service(s) only when success is expected (see blocks 735, 736, and 760). This results in a smoother user experience. In order to make the method and system of FIG. 7 work effectively, however, each client system preferably maintains a local copy of (1) the intentions for each user and each affected service, and (2) the method of access permitted for each user and each affected service.

FIG. 8 illustrates a network computing environment 800 having a centralized authorization system in which intentions management is primarily addressed by an access control engine 810. Environment 800 preferably comprises an end user 802 communicating with a web-services client system 804 using a network communication device. A client-side fabric 806 associated with client system 804 interacts with an authentication system 808. Authentication system 808 interacts with the access control engine 810. Access control engine 810 is preferably constructed and arranged to selectively interact with a consent engine 814.

Like other embodiments illustrated herein, the embodiment depicted in FIG. 8 generally focuses on determining whether the client system 804 is authorized to access user-specific information that is stored in connection with one or more services provided by a web-services provider (see, for example, FIG. 2 herein). The client-side fabric 806 first determines whether the desired user-specific information is available from a local data store (see blocks 822, 824, and 826). If a local copy is unavailable, client-side fabric 806 redirects to the authentication system 808 (block 828). In the context of FIG. 8, this step may be referred to as a first entry into authentication system 808. At block 830, authentication system 808 attempts to authenticate end user 802 and each affected service. At block 831, authentication system redirects to access control engine 810. Block 831 reflects one of the differences between the system and method reflected in FIG. 8, and those reflected in FIGS. 5-7 and FIG. 9.

At block 835, access control engine 810 compares the client's current access request(s) to any authorizations end user 802 has already granted to client system 804. In other words, access control engine 810 determines whether the client's intentions (the type of user-specific information requested and how the client intends to use such information) and desired method of access are already authorized in the access control lists associated with each affected service. If a match is found at block 835, access control engine 810 posts a success message to authentication system 808 at block 858. In the context of FIG. 8, this step may be referred to as a second entry into authentication system 808.

If a success is posted to authentication system 808 at block 858, authentication system 808 should return the necessary authenticated tickets to client-side fabric 806 (blocks 839, 832, 834). Upon receipt of such tickets (block 860), client-side fabric 806 proceeds to block 836 where it sends an appropriate SOAP request message to each affected service. Recall that, in this scenario, the access control lists authorized the access. As such, each affected service fills the client's request at block 846. Thereafter, client-side fabric 806 proceeds along a success path (blocks 864 to block 826).

If, for any reason, authentication system 808 determines that it will not grant the necessary authenticated tickets, authorization is denied (block 860) and client side-fabric 806 proceeds to block 861. At block 861, client-side fabric 806 determines whether to resubmit the request or terminate. If it chooses to resubmit the request, it redirects to the first entry point into authentication system 808 and the process repeats.

Returning to access control engine 810, if no match is found at block 835, consent engine 810 next determines whether user 802 has identified any default authorization preferences that permit client's access request (block 852). If such defaults can be used, access control engine 810 updates to the access control lists associated with each affected service (block 854) and posts a success message to authentication system 808. Thereafter, the process proceeds along a success path similar to that described above. It should be understood that a partial success is also possible (e.g., default preferences permit some but not all of the client's requests).

If, at block 852, access control engine 810 determines that existing the user's default preferences do not authorize the client's current access request, access control engine 810 decides whether to call consent engine 814 (block 866). At block 866, access control engine 810 preferably determines whether consent engine 814 is trusted (e.g., has a trusted application ID). If consent engine 814 is not trusted, access control engine 810 returns a failure to authentication system at block 858 and the process proceeds along a failure path (e.g., block 859 to 860 to 861).

If consent engine 814 is trusted, consent engine 814 presents a list of options for display on the user's network communication device (block 872). Such options are preferably displayed in a form similar to that illustrated and described in connection with FIG. 3. If user 802 grants permission, consent engine 814 posts a success message to access control engine 810 (blocks 874, 876). Thereafter, the process proceeds along a success path similar to that already described. If, however, user 802 denies permission, consent engine 814 posts a failure message, the process proceeds along a failure path, as illustrated.

One of the advantages of the system and method illustrated in FIG. 8 is the provision of a single consent experience to user 802. The embodiment of FIG. 8 also provides a single point (i.e., at access control engine 810) for looking up client intentions. The embodiment of FIG. 8 may also result in reduced operating costs and increased availability due to the single point of authorization. It should further result in fewer server-to-server calls which reduces impacts on client systems. The embodiment of FIG. 8 also precludes client systems from making the determination of whether to invoke consent engine.

FIG. 9 illustrates a network computing environment 900 in which each web-services service preferably handles intentions management functions. Like other embodiments illustrated herein, the system and method depicted in FIG. 9 generally focuses on determining whether a user 902 has authorized a client system 904 to have access to user-specific information stored in connection with one or more services provided by a web-services provider. The computing environment 900 preferably includes the end user 902 communicating with the client system 904 using one or more network communication devices. A client-side fabric 906, associated with client system 904, is preferably constructed and arranged to interact with an authentication system 908, an access control engine 910, and a consent engine 914.

In operation, when client system 904 desires certain user-specific information, client-side fabric 906 first checks to see if a current copy of the information is available locally (blocks 922, 924, 926). If a current, local copy is unavailable, client-side fabric 906 redirects to the authentication system 908 (block 928). At blocks 930-934, authentication system 908 preferably authenticates user 902 and each of the services to which client system 904 desires to gain access (blocks 930-934).

Upon receiving the necessary authenticated tickets, client-side fabric 906 sends an access request message to each affected service (block 936). Recall that FIG. 9 illustrates an embodiment in which intentions management is addressed by each web-services service. Hence, upon receiving the access request message, each service preferably evaluates the message to determine if user 902 has an access control list entry for client system 904. If an access control entry for client 904 exists, the service then determines if the client's intentions and requested method of access match the authorization levels already granted to client 904 and reflected in the access control list. If no access control entry exists for client 904, or if the client's intentions and/or requested method of access are not currently authorized, the service returns an error to client-side fabric at block 946. On the other hand, if the access control entry for the service authorizes the client's intentions and requested method of access, the service returns a success message and fills the access request at block 946.

If block 946 reflects a successful access request (block 962), client-side fabric 906 proceeds along a success path identified by blocks 964 and 926. If block 946 reflects a failed access request, client-side fabric 906 redirects to access control engine 910. At block 952, access control engine 910 attempts to match the client's intentions and methods for each affected service with the user's default authorization preferences. If access control engine 910 is able to use the user's default preferences for each of the client's requests (e.g., the defaults authorize client 904 to access the requested subject matter by the requested method), it updates the necessary access control lists and returns a success message to client-side fabric 906 (blocks 954, 958). Thereafter, client-side fabric preferably proceeds along a success path identified by blocks 936, 946, 962, 964, 926.

If access control engine 910 is able to use the user's default preferences for some but not all of the client's requests (a partial success), it updates the access control lists for which the default preferences permit access (block 954). In this case, access control engine 910 returns a response indicating which the success and failure, as appropriate (block 958). Preferably, such a message indicates success/failure per service, per intention, and per method.

If access control engine 910 returns a partial success or total failure at block 958, client-side fabric 906 determines whether to call the consent engine 914. In the case of a partial success, for example, client-side fabric 906 may choose to proceed with respect to only those services to which access is authorized. In such case, client-side fabric preferably proceeds along the success path identified above.

If client-side fabric calls consent engine 914 at block 966, a list of options is presented to user 904 on his/her network communication device (block 972). As discussed in greater detail above, such options are preferably presented in a format consistent with that illustrated and described in FIG. 3. At block 974, consent engine 914 receives a signal originating from the user's network communication device indicating the user's consent decision. If user 902 authorizes access, consent engine 914 calls access control engine 910 (see block 976). If user 902 denies access, consent engine returns a failure to client 904. Recall that, in the present embodiment, consent and authorization proceed on a service-by-service basis.

When consent engine 914 redirects to access control engine 910 (i.e., user 902 authorized access), the latter initially confirms that consent engine 914 has a trusted application ID (block 980). If consent engine 914 is not trusted, access control engine 910 returns a failure at block 958. If consent engine 914 is trusted, access control engine 910 updates the affected access control list (block 954) and returns a success message to client-side fabric 906 (block 958). Depending upon the success or failure of any particular request, client-side fabric 906 proceeds along the appropriate success or failure path (discussed above).

One of the advantages of the embodiment of FIG. 9 is that client 904 is able to directly call into the desired service without any intervention. Further, in this embodiment, access control engine 910 is called only upon a failure at a particular service. Likewise, consent engine 914 is called when there a failure occurs at access control engine 910.

Figure 10:
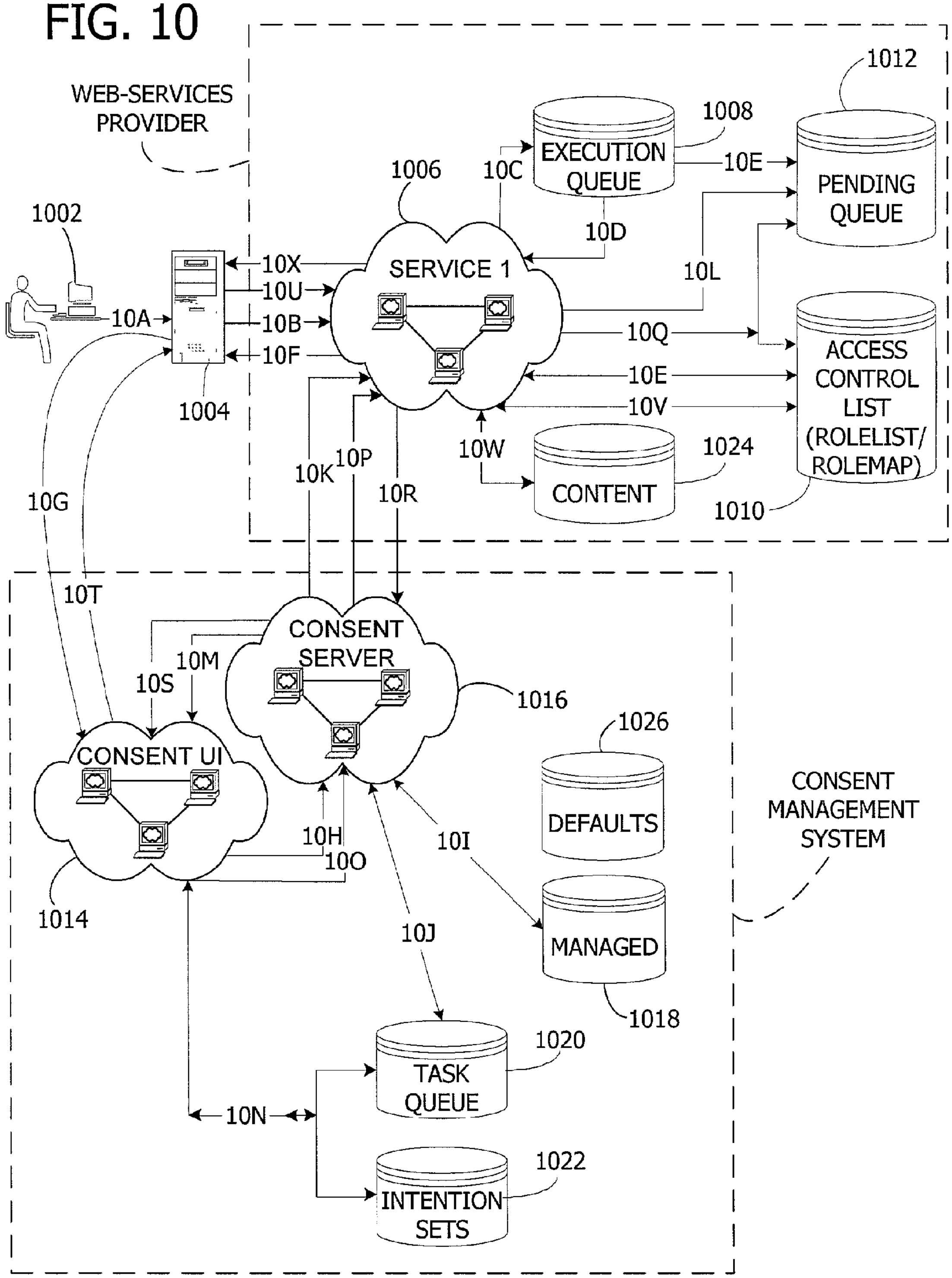
FIG. 10 is a flow diagram illustrating aspects of one embodiment of a method and system for managing a consent transaction in a network computing environment.

FIGS. 10-12 are flow diagrams that illustrate aspects of a system and method for managing a consent transaction in a network computing environment. More particularly, these figures illustrate, by way of an exemplary operating scenarios, a system and method for managing one or more requests to access user-specific information maintained in connection with one or more services offered by a web-services provider.

FIG. 10 is a flow diagram that illustrates an exemplary operating scenario associated with a consent management system and method in which a user 1002 is accessing the user's own user-specific information. In particular, the user 1002 establishes a network communication session with a client 1004 as reflected by line 10A. For example, the client 1004 may be a World Wide Web Internet Service Provider (ISP) and user 1002 seeks to access an item of that user's own user-specific information maintained in connection with a web-services service 1006. In the illustrated scenario, the item of user-specific information is maintained in a data store 1024.

In order to access the item of user-specific information in the data store 1024, client 1004 sends an access request message (line 10B) to the web-services service 1006 associated with the item of user-specific information. In one embodiment, the access request message is in SOAP format and identifies a client ID, the item of user-specific information to which the client desires access, an intended purpose of the client for accessing the item of user-specific information, a requested method of access, and an optional value proposition associated with the access request.

In one embodiment, the access request message also includes SOAP forward and/or reverse message path information (i.e., <srp:rev><srp:via> information). The SOAP routing protocol does not define an actual message path. SOAP may be bound to an application layer protocol, such as HTTP or SMTP. Advantageously, the SOAP extensibility model may be used to describe an entire message path within the SOAP message structure. As such, an appropriate SOAP message can be constructed that can be carried within HTTP or exchanged directly over a transport layer protocol, such as TCP or UDP. More particularly, a forward message path can be described as an ordered list of "via" elements, indicating the intermediary(ies) that the message must pass through. Similarly, an optional reverse message path element "rev" can be used that describes a path for transferring messages to the initial sender. Thus, the <rev> element indicates that there is some way for the recipient of the initial message to communicate with the original sender without using the request-response mechanism built into HTTP. The <via> element follows, as it is the actual path used to send communications. The following is an example:

<rev><via>//c.com/rev/endpoint1;up=udp</via></rev>

The service 1006 holds the access request in an execution queue 1008 until resources are available to process the request (lines 10C, 10D). Service 1006 checks an access control list 1010 (illustrated in FIG. 10 as a data store containing roleList and roleMap entries) associated with the data store 1024 of user-specific information to determine if access permissions presently exist to permit client 1004 to access the item of user-specific information. In the illustrated embodiment, the access request is also placed in a pending request queue 1012 and assigned a pending queue ID to the request.

If service 1006 determines that the access control list 1010 presently permits client 1004 to access the item of user-specific information by the requested method for the intended purpose, service 1006 holds the pending request and a success message is sent back (along with the pending queue ID).

If service 1006 determines that client 1004 lacks permission to access the item of user-specific information, service 1006 sends a fail/fault message (along with the pending queue ID) to client 1004. Upon receiving a fault, client 1004 is not able to access the item of user-specific information and has the option of invoking a consent management system in an effort to obtain the necessary access privileges. In the illustrated embodiment, the consent management system comprises two main components—a consent user interface 1014 (consent U.I.) and a consent server 1016.

As part of invoking the consent management system, client 1004 identifies the access request that generated the fault response from service 1006. In particular, client 1004 sends a message to the consent U.I. 1014 (line 10G) indicating the pending queue ID and affected service, the item requested, the client's intended purpose for accessing (i.e., the intentions) the item, and the requested method of access. Consent U.I. 1014 passes this information to the consent server 1016 (line 10H). It is also possible for the service(s) generating the fault response to pass the access request information directly to the consent management system. Such an approach would be advantageous in a configuration in which the service and the consent management system are maintained substantially together.

The consent server 1016 next checks a data store 1018 to determine if user 1002 is a managed user (line 10I). Determining whether user 1002 is a managed user allows consent server 1016 to identify a party with authority to consent to allow client 1004 to access the item of user-specific information. A scenario involving a managed user is discussed in greater detail below. The remaining discussion of FIG. 10 assumes that user 1002 is unmanaged.

After determining that user 1002 is an unmanaged user and owns the item of user-specific information, consent server 1016 places the client's request in a task queue 1020 (line 10J) and assigns a task queue ID. Task queues will be discussed in greater detail in association with FIGS. 11A and 11B. In the illustrated embodiment, consent server 1016 also sends a request to service 1006 (via line 10K) requesting that service 1006 not allow the pending request (reflected by the pending queue ID) to expire and be purged from the pending queue 1012. Consent server 1016 also sends a message to client 1006 identifying the fault being addressed, the task queue ID, and the pending queue ID. Upon receiving the message from consent server 1016, service 1006 preferably extends the expiration time of the request of client 1004 (as reflected by line 10L to pending queue 1012), and client 1004 redirects user 1002 to the consent U.I. 1014.

It should be understood, however, that it is also possible that the pending time will not be extended. For example, considerations relating to efficient management of pending queues may result in a service declining to extend the pending time. In such a case, the service returns a zero time value to the consent server and the consent system informs the client of a failed consent transaction process.

Advantageously, the task queue and pending queue information can be used to coordinate the consent U.I. 1014 to ensure that user 1002 is presented with a consent menu that corresponds to the access request of client 1004. In other words, this information facilitates the coordination of an otherwise disconnected process. Thus, in the illustrated embodiment, consent server 1016 provides the pending and task queue information to consent U.I. 1014 (line 10M). Upon receipt of this information, consent U.I. 1014 retrieves the appropriate information from task queue 1020 and the intention sets 1022 (line 10N) to prepare an appropriate consent menu for display to user 1002. The consent menu preferably prompts user 1002 to either grant or deny consent to allow client 1004 to access the item of user specific information. FIG. 3, discussed in greater detail above, illustrates aspects of one possible consent menu.

In the embodiment illustrated in FIG. 10, while awaiting a response from user 1002 with respect to the consent menu, consent U.I. 1014 sends a message to consent server 1016 to indicate the status of the consent transaction (line 10O), such as a message indicating that an approval is pending. If user 1002 grants consent, consent server 1016 thereafter sends a similar message to service 1006 (line 10P) and removes the task from the consent server's task queue 1020. In the illustrated embodiment, consent server 1016 also instructs service 1006 to update (i.e., an insert request) the access control list 1010 to reflect the granting of consent (line 10Q). It should be appreciated that such a grant of consent may be time-limited. In other words, the fact that client 1004 has consent now does not mean that such consent cannot expire. A particularly short time limit could be used to effectively limit client 1004 to a "one time only" access. It should also be appreciated that an alternative system could be constructed in which, upon receiving consent from user 1002, the access request of client 1004 may be filled without updating the access control list 1010. In other words, a one-time only approval is also possible without a time limited access control list entry. It should further be understood that the consent server could be constructed and arranged to write roles directly to the access control list 1010, rather than indirectly through the service.

Also, in one embodiment the consent server is the only application with authority to update access control lists. Stated differently, even though a client might enjoy permissions to access various items of user-specific information by various methods, the consent server is the only application with authority to alter the content of an access control list.

Once the access control list 1010 has been updated to permit the client's request, the next step is filling the request. Service 1006 sends a message (line 10R) to consent server 1016 indicating a success. If the original access request of client 1004 was a non-query replace request (e.g., client 1004 sent a request seeking to replace an item of user-specific information, but did not request to actually read any particular item of information), service 1006 fills the request and success is returned to consent server 1016 (line 10R). Preferably, any replace request includes a change number value that can be used by service 1006 for a data consistency check. Consent server 1016 passes the success message to consent U.I. 1014 (line 10S) which is passed to client 1004 (line 10T).

If, on the other hand, the original access request of client 1004 required data to be returned to client 1004 (e.g., the original request was a query/read request), service 1006 attempts to fill (execute) the pending request and the results are returned to client 1004 using the SOAP <srp:rev><srp:via> information submitted with the access request from client 1004. A success message is also sent to consent server 1016. If no <srp:via> was provided, service 1006 has no way of knowing how to return the query results to client 1004. Likewise, in some circumstances a replace request (sometimes referred to as a write or insert request) cannot be completed as requested. In either case, a failure message is sent to consent server 1016 which is passed to client 1004 via consent U.I. 1014. If client 1004 still desires to complete the access request, it must thereafter transmit a retry request to service 1006 (resends its original access request, coupled with the pending queue I.D. to ensure that service 1006 does not view the request as a new request). This is shown by line 10U. Because the access control list has been updated to permit the client to access the item of user-specific information by the desired method, the request may now be filled (lines 10V, 10W, and 10X). Advantageously, this facilitates situations in which client 1004 has given up or no longer needs/desires access to the item of user-specific information. For example, in some circumstances a particular client may directly request user 1002 to provide the item of user-specific information (e.g., a preferred mailing address), rather than wait for the consent transaction to complete.

If user 1002 refuses to grant consent to allow client 1004 to access the item of user-specific information, the pending request will eventually expire. In such case, if client 1004 sends another access request, service 1006 will treat it as a new request.

Figure 11A:
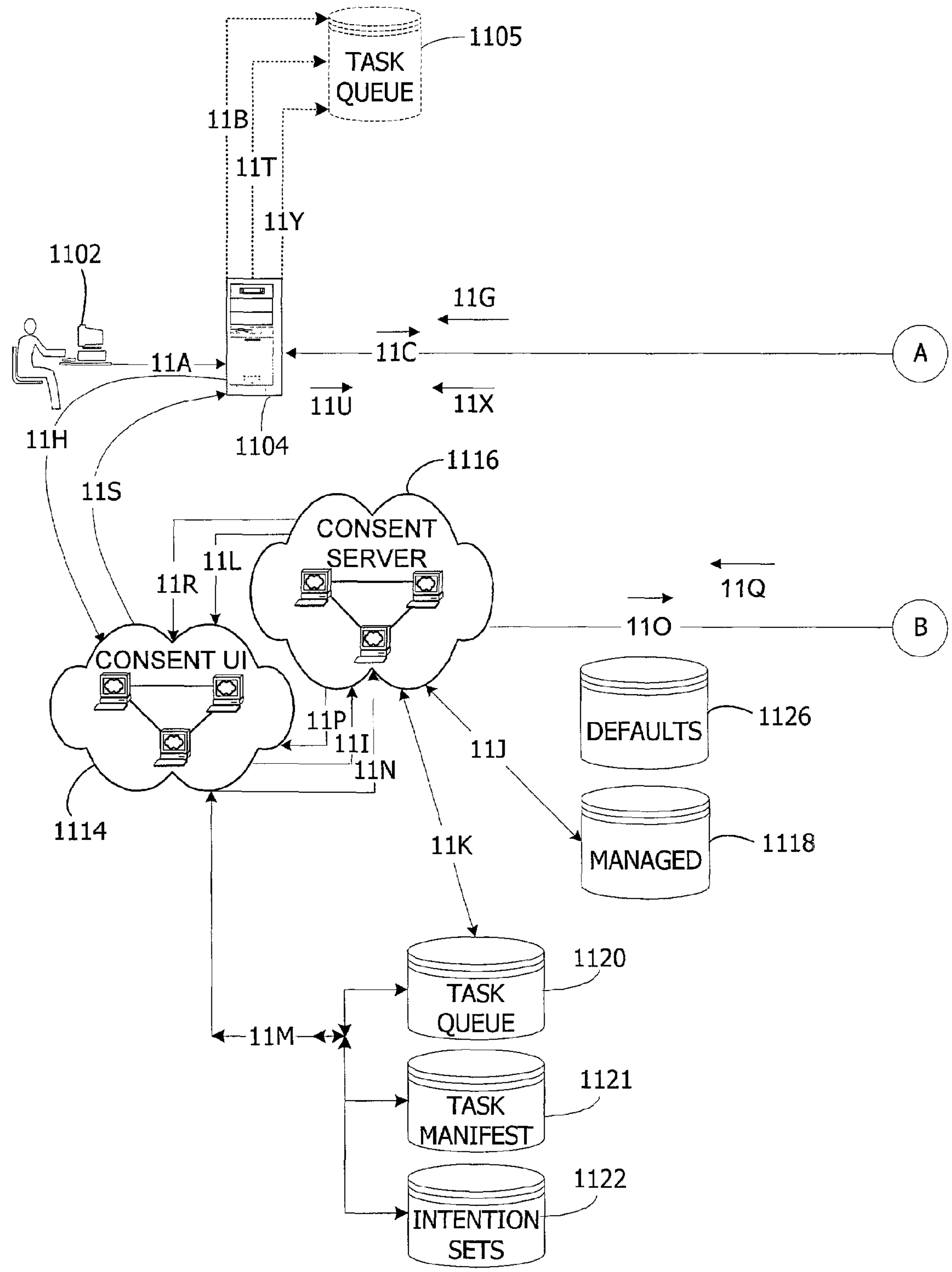
FIGS. 11A and 11B illustrate in flow diagram form aspects of a task-based method and system for managing a consent transaction in a network computing environment.
Figure 11B:
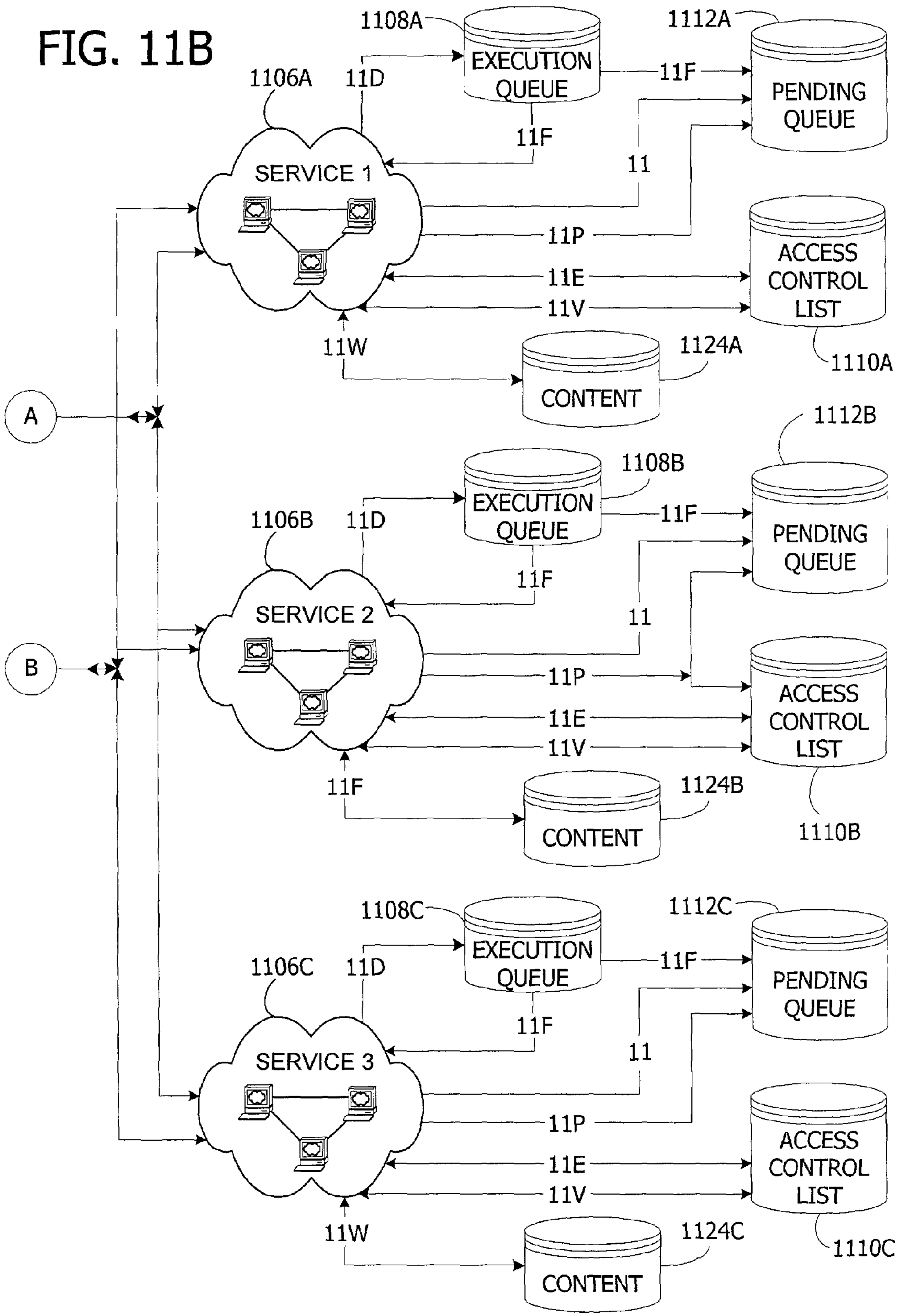

Referring next to FIGS. 11A and 11B, illustrated therein is a flow diagram of an exemplary operating scenario associated with a task-based consent management system and method in which a user 1102 has initiated a task that requires a client 1104 to complete a number of different access requests directed to a number of different services. For example, if client 1104 is a web-based travel services provider and user 1102 has requested travel information regarding travel to a particular destination, client 1104 may need to access the user's calendar information (e.g., from service 1106A), and financial information (e.g., from service 1106C), and preference information (e.g., from service 1106C). In general, the access requests to each of these services could be handled in a manner similar to that described above with respect to FIG. 10. Advantageously, however, the system and method reflected in FIGS. 11A and 11B allows for a task-based approach, that provides several benefits which will become apparent.

For purposes of illustration only, it will be assumed that an access control list 1110A associated with the first service 1106A permits client 1104 to access a first item of user-specific information needed to complete the task. It will be likewise assumed that an access control list 1110C associated with the third service 1106C permits client 1104 to access a third item of user-specific information needed to complete the task. Finally, it will be assumed that an access control list 1110B associated with the second service does not initially permit client 1104 to enjoy access to a second item of user-specific information needed to complete the task.

With the foregoing illustrative assumptions in mind, the scenario of FIGS. 11A and 11B will now be described. In the illustrated embodiment, at line 11A, user 1102 operatively initiates a task that requires client 1104 to execute three separate access requests to three separate services (1106A-1106C), seeking access to three separate items of user-specific information. Client 1104 translates the task request into three distinct access requests that need to be filled to complete the task. Optionally, client 1104 may also keep track of each of these requests in a client-side task queue 1105 (line 11B). Thus, each service is sent a SOAP access request. Each service places the respective request in an associated execution queue until resources are available to process the request. Each service attempts to fill (process) the request by comparing the request to the appropriate access control list document (e.g., access control list 1110A-1110C). Each service also places the respective request, including the SOAP <srp: rev><srp:via>, in an associated pending request queue (e.g., pending request queues 1112A-1112C) and assigns a unique pending queue ID. Each service sends a pending response message back to client 1104, along with the associated pending queue ID and an indication of the success/failure state of the request. Based on the exemplary assumptions above, services 1106A and 1106C would return success responses, and service 1106B would return a failure response.

At this point, client 1104 can choose to treat each request separately and proceed in a manner similar to that described above with respect to FIG. 10. Or, client 1104 can take advantage of the task-based features of the consent management system illustrated in FIGS. 11A and 11B. If client 1104 chooses the latter, it redirects to the consent U.I. 1114 with a consent transaction request, and none of the individual access requests are filled until client has the necessary consent to fill each of the access requests.

The consent transaction request identifies each affected service (e.g., 1106A-1106C), the associated pending queue ID, and the particulars of each request (e.g., the clients intentions, the requested method(s) of access, and the success/fail state of each request). Consent U.I. 1114 calls the consent server 1116 and supplies the necessary information, in a manner similar to that described above with respect to FIG. 10. Consent server 116 first determines whether user 1102 is a managed user. For purposes of illustration, it will be assumed that user 1102 is unmanaged and owns the items of user-specific information to which client 1104 seeks access.

The consent server 1116 places each request in a task queue and assigns a single task queue ID to track the request. Consent server 1116 thereafter sends a message to each affected service (1106A-1106C), instructing the service to extend the expiration time for each pending request. Consent server then sends the task queue information to consent U.I. 1114 for preparation of a consent menu. In the illustrated embodiment, consent U.I. determines the appropriate content of the consent menu by reference to the task queue 1120, an intention set 1122, and an optional task manifest 1121. The task manifest 1121 preferably comprises a database that is used to control the task queue 1120 on behalf of client 1104. For example, task manifest 1121 comprises a look up table that translates a task request into a plurality of individual access requests. In other words, task manifest 1121 uniquely identifies a series of access requests that need to be successfully filled in order to complete a task.

In the present example, consent U.I. uses the task information to assemble a consent menu for presentation to user 1102. In this task-based scenario, each of the three access requests are preferably identified in the consent menu. Those requests that have success states are preferably displayed "grayed out" or "disabled" because consent has already been granted; consent is only requested for the access request directed to service 1106B. In one embodiment, the consent menu identifies the task, an identity of the client, an intended use by the client of the requested user-specific information, the method(s) of access desired by the client to complete the task, and an indication of the status of each access request needed to complete the task. If user 1102 consents, consent U.I. 1114 sends an approval pending message (sometimes referred to herein as a consent acceptance message) to consent server 1116. Thereafter, consent server 1116 sends an approval pending message to services 1106A-1106C, and an update request to service 1106B. The update request directs service 1106B to insert an appropriate role into access control list 1110B to permit client 1104 to access the second item of user-specific information. A consent success message may also be transmitted to the client at this time.

At this point, consent has been received for each of the three access requests that were translated from the initial task request. Thus, the next step is filling each access request. Each service fills the respective access request in a manner similar to that described above with respect to FIG. 10. If client 1104 has chosen to maintain its own client-side task queue 1105, it will then purge this queue upon obtaining consent to successfully complete each of the task requests.

As can now be appreciated, therefore, the task-based approach illustrated and described with respect to FIGS. 11A and 11B allows the consent system (e.g., consent U.I. 1114 and consent server 1116) to ensure that the client has permission to access each of the items of user-specific information before any of the access requests are filled. Also, this approach allows clients to leverage off of the capabilities of a centralized consent system. For example, the client need not maintain all of the information and infrastructure necessary to complete complex, task-based requests because the consent system manages the consent transaction on behalf of the client. Thus, the client can focus its resources on matters which are more directly related to its core area(s) of emphasis. For example, a travel service can focus fulfilling complex tasks, without the need to simultaneously manage complex, disconnected consent transactions that may be needed to complete the requested task.

Figure 12A:
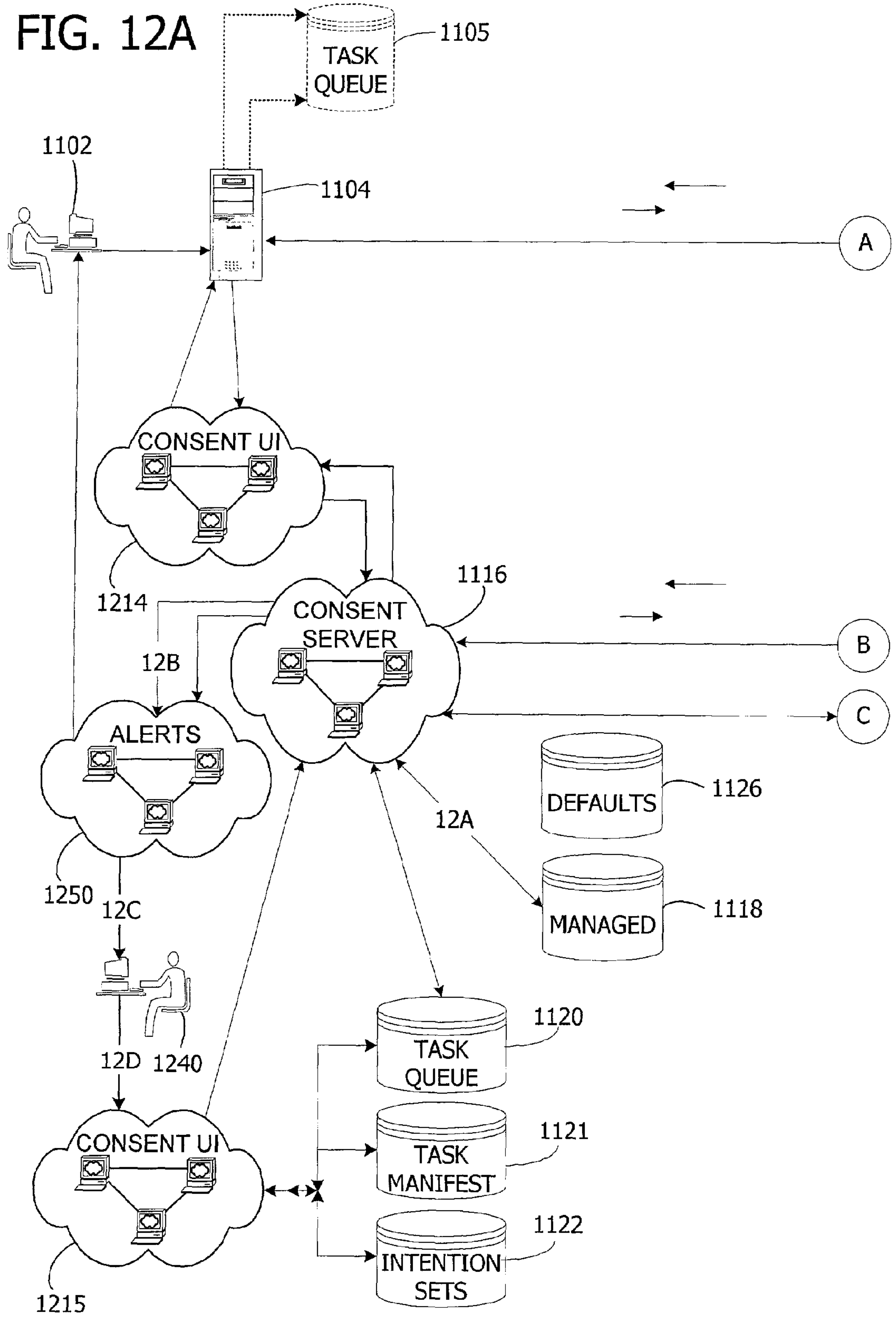
FIGS. 12A and 12B illustrate in flow diagram form aspects of a method and system for managing a consent transaction that involves identifying a person with authority to grant consent.
Figure 12B:
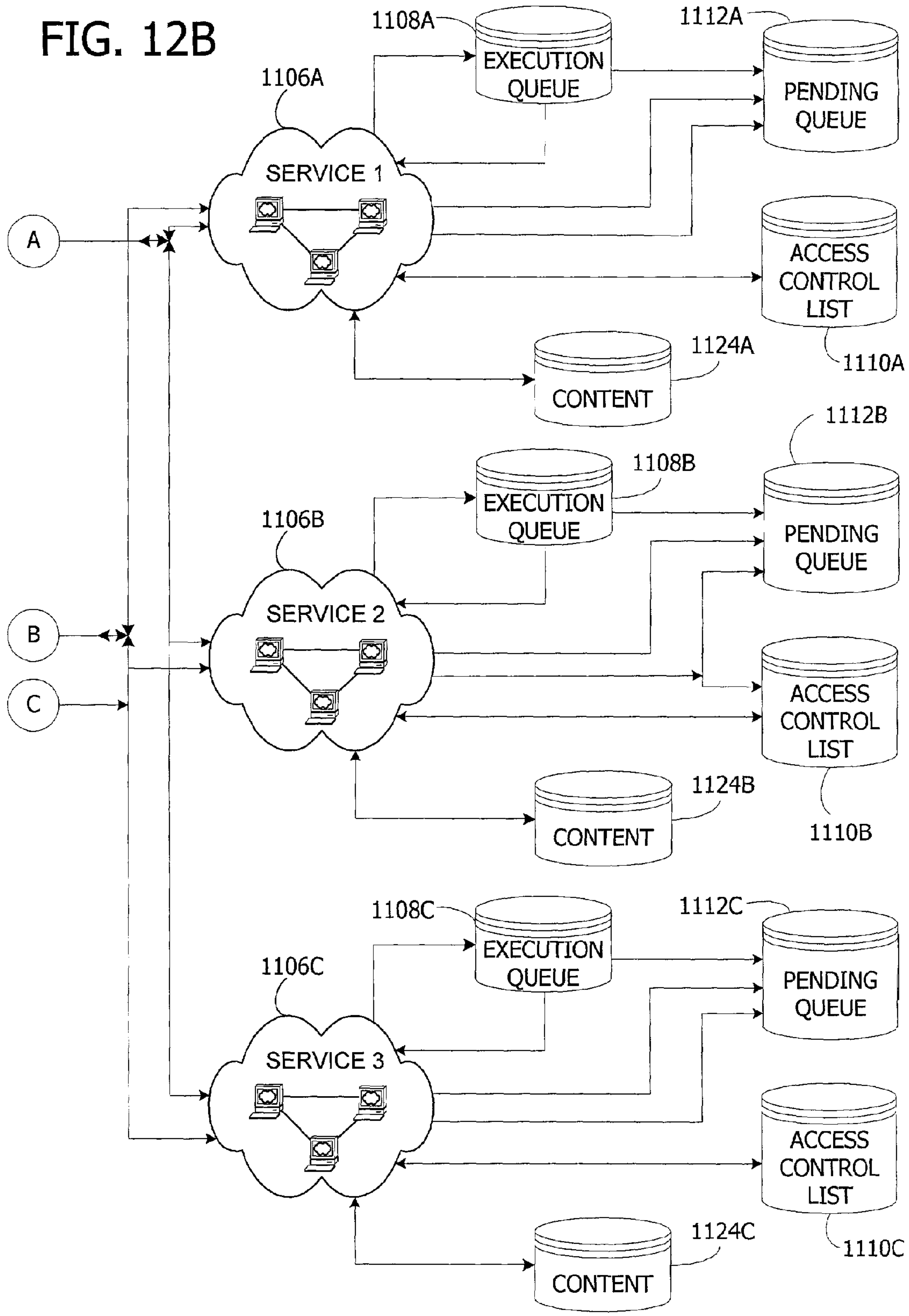

FIGS. 12A and 12B are a flow diagram illustrating aspects of a consent management system and method that illustrates consent transaction involving a user who does not have authority to grant consent to allow a client to access an item of user-specific information. For simplicity, it will be assumed that the scenario illustrated in FIGS. 12A and 12B generally corresponds to that illustrated in FIGS. 11A and 11B, with a difference being that user 1102 lacks authority to grant consent to allow client 1104 to access the information. One reason why user 1102 may lack authority to grant consent is because user 1102 may be a managed user (e.g., user 1102 is a minor under the age of 13 and subject to the COPPA rules discussed above, or user 1102 is an employee and the employer has designated user 1102 as a managed user). Another reason why user 1102 may lack authority grant consent is because user 1102 does not own of the item of user-specific information to which client 1104 seeks access. For example, user 1102 may have initiated a task that requires client 1104 to access calendar information related to another user. Referring back to the example of FIGS. 11A and 11B, if user 1102 initiates a task relating to travel planning that involves another user, client 1104 may need to access user-specific information stored in connection with the other user.

The following steps summarize the system and method to the point at which the consent system (consent server 1116) needs to determine whether user 1102 is a managed user and the owner of the requested information:

1. User 1102 goes to client 1104 and initiates a task concerning another user.
2. In order to complete the task user 1102 has initiated, client 1104 translates the task request into a plurality of discrete access requests. The following is an exemplary list of three discrete task requests, directed to three services (1106A-1106C), translated from a single task request: (note that client 1104 has the option of storing this information in its optional task queue 1105)
    a. Query (read) a first item of user-specific information maintained at first service 1106A;
    b. Insert a new element of user-specific information to be maintained at second service 1106B; and
    c. Replace all elements of user-specific information at third service 1106C.
3. Each service is sent a SOAP access request (sometimes referred to herein as a tryRequest).
4. Each service places the request in an execution queue (e.g., 1108A-1108C).
5. Each service attempts to execute by comparing the request to the access control list document (e.g., 1110A-1110C).
6. Each service places the request, including the SOAP <srp:rev><srp:via>, in an associated pending queue (e.g., 1112A-1112C) and assigns a pending queue ID to the request.
7. Each service sends back a pending response with the pending queue ID and success/failure state to client 1104. Recall that the illustrative example assumes that client has consent to complete the requests directed to services 1106A and 1106C, but not service 1106B.
8. Client 1104 redirects with a request to consent U.I. 1214 containing pending queue/service, intentions, request method, and a status of each request.
    (Service 1106A=Success, Service 1106B=Failure, Service 1106C=Success)
9. Consent U.I. 1214 calls consent server 1116 with the request.

At this point, consent server 1116 determines whether user 1102 has authority to grant consent with respect to the failed access request directed to the second service (service 1106B). In the illustrated embodiment, this determination is accomplished by referring to a data store 1118 that identifies whether a particular user is a managed user and whether a user is an owner of an item of user-specific information (line 12A). Stated differently, the data store 1118 identifies a party with authority to grant consent. This party with authority may be user 1102 or another party 1240. In one embodiment, data store 1118 comprises a table with entries indicating a manager ID, a managed ID, and a service ID. If the manager ID and the managed ID are the same, then the user is not managed for the service reflected by the service ID. For example, a parent of a minor child may desire to manage access to the child's calendar but may not desire to manage access to the child's music data (e.g., in a music service). In such an example, the table would include the following data rows:

Child ID, Child ID, Music Service ID

Parent ID, Child ID, Calendar Service ID

Referring still to FIGS. 11A and 11B, in the illustrated scenario, data store 1118 indicates that user 1102 is either a managed user or is not the owner of the item of information associated with the request directed to service 1106B. In either case, user 1102 is not a party with authority to grant consent to client 1104. Accordingly, the consent system seeks consent from the party 1240 with authority to grant consent, rather than from user 1102. The party with authority to grant consent 1240 may be a manager (e.g., a manager of the managed user to whose information the client seeks access) or the owner of the requested item of user-specific information (e.g., an unmanaged user to whose information the client seeks access on behalf of user 1102).

The requests are also placed in a task queue 1120 and assigned a task queue ID, similar to the scenario illustrated in FIGS. 11A and 11B. Likewise, each service (1108A-1108C) is sent a message instructing the service to extend the expiration time of the request while consent is being negotiated. Unlike the scenario of FIGS. 11A and 11B, however, the requests are also placed in an alert queue 1250 (line 12B). An alert message (line 12C) is thereafter sent to the owner or manager of the requested item of user-specific information (the person with authority to grant consent 1240, hereinafter referred to as owner/manager 1240). It should be understood that, such an alert message can be sent to owner/manager 1240 as an email message, as a digital paging message, as a telephone message, as an instant message, as another form of digital message, or as a combination of these message formats. The alert message preferably includes an indication of the identities of user 1102 and client 1104, as well as the specific information to which client 1104 desires access (e.g., access to calendar information). The alert message may also include an indication of the original task that initiated the entire consent process, as well as other pertinent information.

The alert message may also be constructed to provide a minimum set of information, such as an indication of who originated the alert and a description of the request at issue. The message could also include a "get details" link that transfers the user to a location where the user can get more detailed information, such as a task pending queue.

Figure 13:
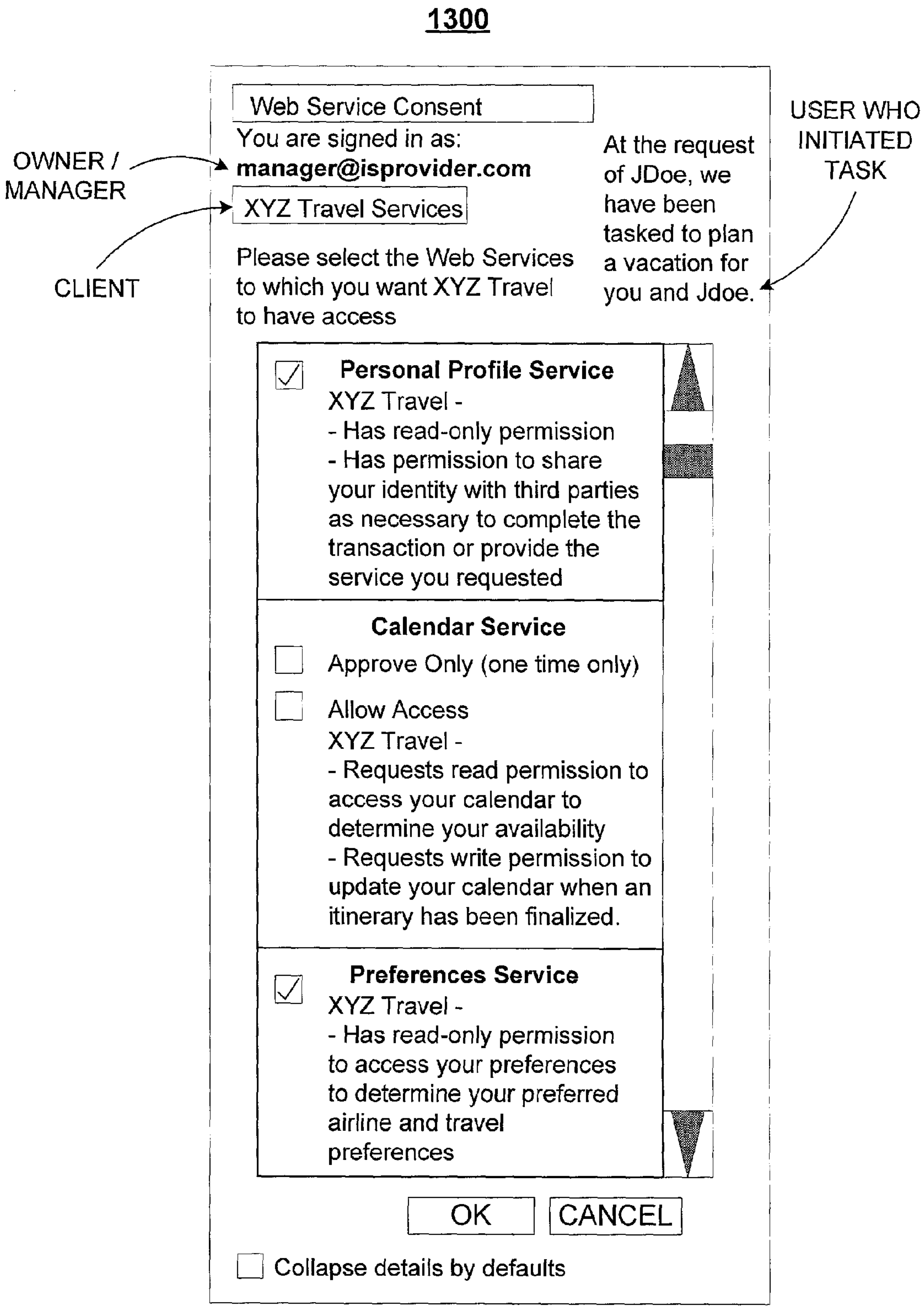
FIG. 13 is one embodiment of an exemplary consent menu for use connection with the methods and systems illustrated in FIGS. 10-12.

When owner/manager 1240 receives the alert message (line 12D) consent U.I. 1215 is called to retrieve the request at issue (i.e., the failed request to the second service 1106B) and to present a consent menu to owner/manager 1240. FIG. 13 illustrates an exemplary consent menu 1300 for requesting consent from owner/manager 1240. The consent menu 1300 is preferably a specialized version of the consent menu of FIG. 3. It should be understood that other menu formats may be used. As shown in FIG. 13, consent menu 1300 identifies the identity of both user 1102 and client 1104, as well as an identity of the managed user. In the illustrated embodiment, consent menu 1300 identifies each of the access requests—even those for which client 1104 already had consent to access (which may be grayed out or disabled). In other words, consent menu 1300 may also provide an indication of the status of each of the access requests that resulted from the task request initiated by user 1102. Consent menu 1300 also provides an indication of the client's intended use and the method (s) of access requested to complete the task. It should be appreciated that a consent menu similar to consent menu 1300 could also be used to present consent menu options directly to the user.

While awaiting approval from owner/manager 1240, consent U.I. 1214 preferably sends a message to client 1104 indicating the delay. A similar message is also sent to user 1102. As can be appreciated, the delay between the time when consent server 1116 sends an alert to owner/manager 1240 and the time at which owner/manager 1240 grants or denies consent can be substantial. For time sensitive requests, client 1104 and/or user 1102 may decide to terminate the effort rather than wait for consent.

Upon receiving consent or denial of consent from owner/manager 1240, the process proceeds generally as discussed above with respect to FIGS. 10 and 11, and user 1102 is sent a message indicating that owner/manager 1240 has granted or denied consent.

It should now be appreciated that the consent management systems and methods reflected in FIGS. 10-12 provide several distinct advantages. At a broad level, the consent management system provides centralized management of consent transactions for the benefit of web-services users and clients.

At another level, the consent management systems and methods of FIGS. 10-12 allow for task-based consent transactions to be carried out. A task-based consent management system is particularly advantageous in disconnected transactions involving users, clients, and multiple web-services services. The consent management system provides a centralized authority for keeping track of each access request that must be filled in order to successfully complete a task.

At still another level, the consent management systems and methods of FIGS. 10-12 help to better ensure that consent is procured only from a party with authority to grant consent. This is particularly attractive in situations involving minors, employees, and requests to access information owned by a user other than the user who initiated the access request.

Further, the consent management systems and methods illustrated and described herein allow a one-time only access, without relying on time-based access limitations. Time-based limitations may result in multiple accesses during the time period. In some contexts (e.g., contexts involving time-sensitive data), a true one-time only access may be particularly advantageous. Of course, there are other advantages.

Table I identifies several additional operating examples. Although these operating examples are generally directed to the methods and systems reflected in FIGS. 10-12, aspects are also applicable to other embodiments disclosed herein.

TABLE I

| User | Owner | Mgr. | Single Service | Multiple Services | Multiple Owners | Wildcard Intention Match | Example |
|---|---|---|---|---|---|---|---|
| X | X | X | X | | | | Joe using ISP to access his profile. No wildcard match. Uses consent UI |
| X | X | X | X | | | X | Joe using ISP to access his profile. Wildcard and intention match. No consent UI |
| X | X | X | | X | | | Joe using XYZ Travel to create an itinerary. Uses consent UI |
| X | X | X | | X | | X | Joe using XYZ Travel to create an itinerary. No consent UI |
| | X | X | X | | | | Joe using ticket system to view Dolores' calendar. Dolores must grant consent |
| | X | X | X | | | X | Joe using ticket system to view Dolores' calendar. Dolores does not need to grant consent. |
| | X | X | | X | | | Joe using XYZ Travel to coordinate an itinerary with Dolores. Dolores must grant consent. |
| | X | X | | X | | X | Joe using XYZ Travel to coordinate an itinerary with Dolores. Dolores does not need to grant consent |
| | X | X | X | | X | | Joe using a calendar system to create a shared calendar event. One or more users must consent. |
| | X | X | X | | X | X | Joe using a calendar system to create a shared calendar event. No further consent required. |
| X | X | | X | | | | Junior using ISP to access his own information. Joe, manager for Junior, must consent. |
| X | X | | | X | | | Junior using ISP to access his own |

TABLE I-continued

| User | Owner | Mgr. | Single Service | Multiple Services | Multiple Owners | Wildcard Intention Match | Example |
|---|---|---|---|---|---|---|---|
| | | | | | | | information. Manager Joe will be contacted for consent. |
| X | X | | X | | | X | Junior using ISP to access his own information. No additional consent required. |
| X | X | | | X | | X | Junior using ISP to access his own information. No additional consent required. |
| X | | | X | | | | Junior using scheduling system to invite Daphne to a party. Dolores, manager for Daphne, must consent. |
| X | | | X | | | X | Junior using scheduling system to invite Daphne to a party. No additional consent required. |
| X | | | | X | X | | Junior using scheduling system to schedule a study session on homework assignments. Parents (managers) must approve the invitation. |
| X | | | | X | X | X | Junior using scheduling system to schedule a study session on homework assignments. No additional consent required. |

The following paragraphs also discuss several operating examples. The examples are not intended to be exhaustive. In general, the first paragraph of each example identifies an operating scenario and the second paragraph describes the consent transaction activities that occur at the network computing level in connection with the example.

Granting Simple Consent Example

Joe is an avid skier and goes to XYZAdventures.com to check out their skiing classes and adventure packages for winter break with Junior. XYZAdventures provides a special set of adventure packages, notification of upcoming sales and vacation packages that match Joe's vacation schedules, as well as special equipment rental and purchase deals for registered members. Joe decides to register in order to take advantage of these cost-saving possibilities. Joe clicks on the "use web-services information" and the consent U.I. appears asking Joe to grant XYZAdventures access to his profile, alerts, and calendar. Joe reviews the purposes to which XYZAdventures is going to put his information and agrees. XYZAdventures shows Joe all of the vacation packages that match his winter break schedule, along with suggestions on rental and purchase equipment that might be necessary.

XYZAdventures does not have access through any of Joe's defaults to Joe's profile service, calendar service or alert service. Failing at the service level, XYZAdventures must redirect to the consent U.I. in order to get Joe's explicit consent.

Denying Simple Consent Example

Dolores goes to WebSite.com on Joe's recommendation. Based upon Joe's recommendation, Dolores simply goes to the registration page. After viewing the intentions for her profile, alerts and contacts services listed in the consent UI, Dolores does not feel that she really wants to participate and denies consent. WebSite.com does not let Dolores navigate beyond the home page.

Dolores does not have any defaults that would allow WebSite access to her contacts and the intentions listed do not match her default profile intentions. WebSite must redirect to the consent U.I. to get access to contacts and profile. WebSite was able to get access to Dolores' Alerts, but is unwilling to provide services without access to all three services.

Blocked Consent Example

Dolores has read that there are certain intermediate applications used by clients that may be rather unscrupulous regarding accessing information. Dolores decides that she will simply not allow access, ever, to any of these intermediate applications. Dolores therefore sets a "deny access" permission against the Intermediate Search engine. When Dolores goes to a particular web site (e.g., a web site directed to knitting enthusiasts) that uses Intermediate Search, she submits a query for patterns using her favorite yarn. This example assumes Dolores gets her search results even though Intermediate Search is blocked from asking Dolores for consent.

Dolores has used the intentional consent U.I. to create the following access control list (roleList) entry on her web-services profile service:

```
<role ID='2328497FHUID0' roleTemplateID="234980FHiu">
  <subject userID="SID-of-Dolores" appID="SID-of-Intermediate">
</role>
```

When Intermediate Search attempts to query Dolores' web-services profile, the service returns the "Denied Access" fault.

In a more complex scenario, it would be feasible that the Intermediate Search business model requires the profile information. In such a scenario, the search engine would fail to send results without the ability to get the profile information. In that case the hosting application would have to be able to explain to the user why the action failed.

Task-Based Permission Example

Joe goes to XYZTravel to book his vacation and chooses "Create an Itinerary." A consent U.I. appears asking for permission to access Joe's contacts and calendar services in order to complete the vacation booking Joe looks through the intentions and approves. Joe then continues to book his vacation.

In order to complete the itinerary task initiated by Joe, XYZTravel translates the task request into a number of access requests. Two of the requests are directed to services for which XYZTravel does not currently have consent to access. In this example, XYZTravel needs consent to access Joe's profile and wallet. These do not appear in the consent U.I. as requiring permission, however, as Joe's defaults allow access. Still, no information is retrieved until all of the permissions are obtained. This prevents XYZTravel from obtaining some of Joe's information without Joe being able to complete the entire task.

Wildcard Matched Consent Example

Joe has created a web-services personal demographic profile so that he can receive local sports and weather information. When Joe logs into a news and weather web site, the site shows Joe a customized page.

Joe has previously created a default that allows any application (e.g., the news and weather web site) that only wants to query his demographic information for the primary use purposes of targeting content and targeting advertising to be allowed access. Because the news and weather web site has only the intention of targeting sports and weather information of interest to Joe, consent to access has been silently granted (i.e., without interrupting Joe's task flow with a consent menu).

Wildcard Blocked Consent Example

Junior is a managed user. Junior goes to Search site to conduct a search. The site, however, collects profile information in order to target advertisements—some of which are not age appropriate. Search site informs Junior that the search result could not be fulfilled because the site requires access to his personal profile before completing search requests.

Joe has previously created a role in the access control list associated with Junior's profile information. The role does not allow Junior's profile information to be accessed, ever. Search site, therefore, is not able to get consent from Junior to access Junior's profile.

User-To-User Consent Example

Jane uses an on-line ticket site to purchase event tickets. The ticket site has a subscription service that will allow Jane to create an "event circle" of up to 6 people. When any of Jane's preferred event types (e.g. stand-up comedy) or specific events (e.g. a particular concert) become listed, the ticket site will reserve tickets for her event circle and then contact Jane regarding the event. Jane pays an annual fee for this service. Jane registers for the service and enters the email addresses for each member of her event circle. The ticket site notifies Jane that two of her circle members need to grant access permissions before it can update their calendars as part of the event circle.

The ticket site attempts to access each of the identified member's web-services calendar service. In two cases, however, there are no access controlled roles (default or previously written) that will allow the ticket site to access the calendar information. The ticket site redirects to the consent system which determines that the owners of those services are not Jane. The owners are notified (e.g., via their alerts preferences) and the ticket site receives a fault.

One Time Permissions

Simple Example

Dolores finds an item she would like to buy on XYZsales.com. The consent U.I. shows Dolores the requirements for the "purchase" task: (a) a shipping address from her profile service; (b) a billing address from her profile service; and (c) a credit card number from her electronic wallet/financial service. Dolores agrees to allow one time access to both services by selecting "approve only" rather than the "allow access" option.

XYZsales.com attempts to access Dolores' profile for the shipping and billing information, as well as her financial service for credit card information. Assuming that Dolores does not have any defaults that will allow this to happen without her explicit consent, XYZsales.com redirects to the consent system. The consent system presents Dolores with a consent menu identifying the components of the purchase task she initiated and XYZsales.com's primary and secondary use intentions. Dolores has the option of either choosing to allow the current transaction on a one time only basis (approve only), or to allow a more persistent entry in her access control list ("allow access"). It should be recalled, however, even a persistent entry can be time limited.

One Time Permissions

User-To-User Example

Joe has an annual party for co-workers and friends. Using an invitation function of his on-line calendar, Joe sends out invitations to all those entries in his contacts service containing a "party" category attribute. Dolores, who is included in the list, receives an alert notifying her that Joe would like to invite her to the party. By clicking on the "approve only" link, Dolores allows a one time only access (an insert/write) to her calendar for Joe.

The on-line calendar client attempts an insert against Dolores' calendar. There is no matching access control list entry, so the on-line calendar client uses the consent system to send a message to Dolores. In this example, Dolores receives the message and chooses to allow the insert. The on-line calendar client completes the insert and the consent system sends a message to Joe indicating that the request has been approved. Because it is an approve only form of consent, the access control list associated with Dolores' calendar is not updated to include a persistent role for the on-line calendar client.

Managed User Consent

Interactive Example

Junior is a managed user. Junior meets some people and he wants to enter them into his contacts service as "friends." Joe manages Junior's user-specific information. Joe always wants to know who Junior is putting into his contact list. In this scenario, assume that the access control list associated with Junior's contacts service has been configured so that Junior is able to Read, Edit and Delete entries, but he is unable to insert new entries. When Junior attempts to insert new entries, Joe gets an alert indicating that there are pending requests for Junior. Joe reviews the contacts that Junior wants to insert and then approves two of them and denies a third one. If Jane also has manager privileges with respect to Junior, she would also have received an alert.

Junior's contact management application client attempts to enter the contacts and fails because the access control list for Junior's contacts service does not permit Junior to insert new entries. The application redirects to the consent system where it is determined that Junior is managed by Joe and Jane. Both Joe and Jane receive alert messages of pending. When Joe goes through the approval/deny process, Junior is sent a message informing him of the approval/deny status.

Managed User Consent

Intentional Example

Junior is a managed user. Joe is Junior's manager. Joe wants to make sure that Junior does not associate with a particular person, John. Joe creates a default access control list role for John, that will cause a "deny access ever" role to be written against Junior's services should John attempt to access any of Junior's services, including alerts.

Joe uses his web-services privacy system to create a role denying John access to all of Junior's services (alerts, inbox, etc.). In one embodiment, because the access is expressly denied (as opposed to a situation in which there was no rule at all regarding John), Joe will not receive a request to approve access to John.

Managed User-To-User Consent Example

Junior is having a party and decides to invite Daphne. Using his calendar client, Junior sends Daphne an invitation. Daphne is a managed user. Daphne's access control rules prevent her from accepting invitations without managed approval. Dolores is Daphne's manager. Dolores receives an alert telling her that there are pending authorization requests for Daphne. Dolores reviews the party invitation, compares it to the family calendar and then discusses it with Daphne. Since Daphne wants to go, and there are no family plans, Dolores approves the invitation. Dolores learns that Junior sends a number of school-related invitations to Daphne as well. Therefore, Dolores chooses to create a role in the access control list associated with Daphne's calendar service that allows Junior to send invitations that Daphne can approve herself.

Junior's calendar client attempts to insert the party event into Daphne's calendar and fails. A fault response causes the application to redirect to the consent system. The consent system notes that Junior is not the owner and that the owner (Daphne) is managed by Dolores. A fault is sent back to Junior's calendar client, the request is put into pending and an alert is sent to Dolores. Acceptance by Dolores executes the invitation, creates the appropriate role and triggers an alert to Junior regarding the approved/denied status.

Policy Management Example

Joe is an employee and a managed user when using his employer's computer network. While working, Joe goes to a web site in an attempt to make an on-line purchase. When Joe attempts to make the purchase, the web site informs him that he cannot purchase from their site unless they are given consent to share the information they collect with whomever they choose. Joe is unable to override and grant access because it is a company policy that information cannot be transferred onward in an uncontrolled manner.

The web site request for access includes the intention of sharing or selling the information to uncontrolled third parties. Because Joe is managed while using his corporate identity, there are a set of default roles over which he has no control. One of those roles prohibits this intention against personally identifiable information (sometimes referred to as PII). This includes Joe's shipping address as the company. This causes a fault. The web site redirects to the consent system with its task ID. The consent system determines that Joe is managed under the circumstances and is not able to change the default. In one embodiment, the consent system will not send any alert to Joe's manager because the error resulted from a denial, not a missing entry.

In privacy terms, PII includes information that can locate a specific individual in the real or virtual world. It would include, for example, email address, physical address, name, telephone number, and so on. It would not include, for example, information elements that cannot uniquely locate an individual, such as cite, state, or country of residence.

Intention Management Example

Joe goes to a financial web site which customizes the pages it displays to show, for example, the user's name and items of local financial news of interest to the user. After reviewing the options, Joe decides to subscribe to the financial advisor program. This program allows Joe to enter a series of stock symbols and industry types (e.g. tech sector) in which he is interested. The financial web site advisors will send Joe email when any of those sectors have something interesting happening. They will also send alerts when there are marked changes in the value of stocks listed in Joe's portfolio. After making the selection, Joe is asked to grant permission for the financial web site to contact him via email and alerts. The financial web site includes verbiage indicating that agreeing to get email and alerts from the financial web site does not mean that the site will send him any other type of email or alert. Joe agrees and starts filling in the required information not available in his web-services.

The financial web site sends a query request against Joe's profile using the task ID and intentions for targeting content and advertising. Assuming that Joe has already granted permission for these intentions as a wildcard, the web site has no problem accessing the required information. When Joe chooses Financial Advisor services, the web site queries for access to Joe's email address from his web-services profile service. The primary intention is to contact Joe. Because there is no match made to any specific or wildcard role in the profile, however, the web site redirects to the consent system where the information and intentions are displayed to Joe on a consent menu. If Joe agrees, the consent system writes a financial web site specific role into Joe's profile access control list that includes the intentions to which Joe has explicitly agreed.

Provisioned Consent Example

Dolores goes to an on-line ticket site and purchases tickets. She already has a calendar created in her calendar service. Dolores does not, however, have a wallet created. She chooses "set one up for me," and a wallet form appears. Dolores enters the appropriate information and chooses Submit. A consent form appears asking her if she wants to grant the on-line ticket site permission to access the wallet information just created. After noticing that the only use the on-line ticket site plans for the wallet is to complete any transactions she initiates, Dolores consents and the tickets are purchased.

The on-line ticket site client discovers that Dolores does not have a wallet service when it attempts to complete Dolores' purchase request. In order to complete the task, the on-line ticket site needs wallet information. Dolores is therefore presented with a web-services wallet service provisioning UI. Once Dolores fills in the information, the on-line ticket site redirects to the consent U.I. in order to get access permission.

The foregoing examples are provided to provide additional context and should not be interpreted as limiting the claims in any way.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

It should also be appreciated that one or more computer-readable media may be used to store computer-executable instructions for performing the methods disclosed herein.

In view of the above, it will be seen that the several objects of the invention are achieved and other advantageous results attained.

As various changes could be made in the above constructions, products, systems, and methods without departing from the scope of the invention, it is intended that all matter contained in the above description and shown in the accompanying drawings shall be interpreted as illustrative and not in a limiting sense.

What is claimed is:

1. A system for controlling access to a data store of user-specific information in a network computing environment being accessed by a client and a user, the system comprising:

a web-services system providing a software service to the user, said web-services system maintaining the data store of user-specific information in connection with the software service;

a data store of default access preferences, said default access preferences defining a list of predetermined access permissions allowed by the user with respect to the data store of user-specific information, the client desiring access to the data store of user-specific information and transmitting an access request message having a parameter indicative of a desired form of access to the data store of user-specific information;

an access control interface associated with the web-services system, said access control interface receiving the access request message and comparing the desired form of access to an access control list associated with the software service, said access control list identifying whether the user has been granted the desired form of access requested by the client;

an access control engine determining an intended use by the client of the user-specific information in the data store of user-specific information, said access control engine also determining a default access preference defining a list of default access permissions to the data store of user-specific information that the user has allowed, the access control engine comparing the determined intended use and the default access permissions and dynamically creating an access control rule granting the desired form of access of the client if the intended use is permitted by the default access permissions; and a consent engine generating an option list in response to the access request having at least one entry in the option list based on the intended use by the client of the user-specific information in the data store, said consent engine displaying on the access control interface an option menu reflecting the generated option list, said option menu prompting the user to accept or reject at least one option displayed on the option menu using a selection interface of a network communication device.

2. The system of claim 1 wherein the access control interface comprises a service-side fabric associated with the software service provided by the web-services system.

3. The system of claim 1 wherein the access control engine comprises:

schema for receiving and parsing the access request message, said schema identifying an intended use by the client of the user-specific information in the data store;

a validation engine, said validation engine determining if the existing default access permissions identified in the access control list permit the client to access the data store of user-specific information for said identified intended use; and a policy engine being invoked if the existing default access permissions identified in the access control list do not permit the client to access the data store of user-specific information for the identified intended use, said policy engine dynamically determining an access control rule by comparing the user-specific default access preferences with said identified intended use, said validation engine writing said access control rule to the access control list.

4. The system of claim 3 wherein the schema for receiving and parsing the access request message further identifies a method by which the client desires to access the user-specific information in the data store.

5. The system of claim 4 wherein the validation engine determines if the existing default access permissions identified in the access control list permit the client to access the data store of user-specific information using the identified method by which the client desires to access the user-specific information in the data store.

6. One or more non-transitory computer-readable storage medium having computer-executable instructions for performing the system recited in claim 1.

7. A method of controlling access to user specific information by a third party in a network computing environment, said network computing environment including a web-services provider, a user of a service provided by the web-services provider, the web-services provider maintaining a data store of user-specific information associated with the user, the third party in digital communication with the web-services provider, the third party desiring access to the user-specific information in the data store, and the user communicating with the web-services provider via a network communication device having a display interface and a selection interface, said method of controlling access to user-specific information by the third party comprising:

obtaining at the web-services provider a digital request message from the third party desiring access to the user-specific information in the data store;

determining an intended purpose of the third party for accessing the user-specific information in the data store;

generating an option list in response to the third party's request message for user-specific information having at least one entry based on the determined intended purpose of the third party for accessing the user-specific information in the data store;

displaying to the user on the display interface of the network communication device an option menu reflecting the generated option list, said option menu prompting the user to accept or reject at least one option using the selection interface of the network communication device;

receiving from the network communication device a selection signal indicative of whether the user accepted or rejected the at least one option; and creating an access control rule based on the received selection signal, said access control rule defining an extent of access to the user-specific information in the data store granted to the third party.

8. The method of claim 7 wherein determining an intended use comprises executing computer-executable instructions comprising:

an access control engine determining an intended use by a client of the user-specific information in the data store of user-specific information, said access control engine also determining a default access preference defining a list of default access permissions to the data store of user-specific information that the user has allowed, the access control engine comparing the determined intended use and the default access permissions and dynamically creating an access control rule granting a desired access of the client if the intended use is permitted by the default access permissions.

9. The method of claim 8 wherein the access control engine comprises:

schema for receiving and parsing the request message, said schema identifying an intended use by the client of the user-specific information in the data store;

a validation engine, said validation engine determining if the existing default access permissions identified in the access control list permit the client to access the data store of user-specific information for said identified intended use; and a policy engine being invoked if the existing default access permissions identified in the access control list do not permit the client to access the data store of user-specific information for the identified intended use, said policy engine dynamically determining an access control rule by comparing the user-specific default access preferences with said identified intended use, said validation engine writing said access control rule to the access control list.

10. The method of claim 9 wherein the schema for receiving and parsing the request message further identifies a method by which the client desires to access the user-specific information in the data store.

11. One or more non-transitory computer-readable storage medium having computer-executable instructions for performing the method recited in claim 7.

12. A method of providing and selecting from a menu displayed on a display interface in a network computing environment, said network computing environment including a web-services provider, a user of a service provided by the web-services provider, the web-services provider maintaining a data store of user-specific information associated with the user, a third party in digital communication with the web-services provider, and the third party desiring access to the user-specific information in the data store, the user communicating with the web-services provider via a network communication device having the display interface and a user selection interface, said method comprising:

retrieving an intentions document associated with the third party desiring access to the user-specific information in the data store, said intentions document identifying:

a purpose for which the third party desires access to the user-specific information in the data store;

a value proposition associated with the purpose for which the third party desires access to the user-specific information in the data store; and a method by which the third party proposes to access the user-specific information in the data store;

generating a set of menu entries in response to the third party's intentions document, said menu entries identifying:

an identity of the third party;

the user-specific information in the data store to which the third party desires access;

the purpose for which the third party desires access to the user-specific information in the data store;

the value proposition associated with the purpose for which the third party desires access to the user-specific information in the data store; and the method by which the third party proposes to access the user-specific information in the data store;

displaying the menu entries on the menu on the display interface of the network communication device;

prompting the user to authorize or deny the third party to access the user-specific information in the data store;

operatively receiving a selection signal being indicative of whether the user authorized or denied the third party to access the user-specific information in the data store; and creating an access control rule indicative of whether the user authorized the third party to access the user-specific information in the data store.

13. The method of claim 12 further comprising:

generating an option list in response to a third party's request message for user-specific information having at least one entry based on the identified purpose of the third party for accessing the user-specific information in the data store;

displaying to the user on the display interface of the network communication device an option menu reflecting the generated option list, said option menu prompting the user to accept or reject at least one option using the selection interface of the network communication device;

receiving from the network communication device a selection signal indicative of whether the user accepted or rejected the at least one option; and creating an access control rule based on the received selection signal, said access control rule defining an extent of access to the user-specific information in the data store granted to the third party.

14. The method of claim 13 wherein determining an intended use comprises executing computer-executable instructions comprising:

an access control engine determining an intended use by a client of the user-specific information in the data store of user-specific information, said access control engine also determining a default access preference defining a list of default access permissions to the data store of user-specific information that the user has allowed, the access control engine comparing the determined intended use and the default access permissions and dynamically creating an access control rule granting the desired access of the client if the intended use is permitted by the default access permissions.

15. The method of claim 14 wherein the access control engine comprises:

schema for receiving and parsing the request message, said schema identifying an intended use by the client of the user-specific information in the data store;

a validation engine, said validation engine determining if the existing default access permissions identified in the access control list permit the client to access the data store of user-specific information for said identified intended use; and a policy engine being invoked if the existing default access permissions identified in the access control list do not permit the client to access the data store of user-specific information for the identified intended use, said policy engine dynamically determining an access control rule by comparing the user-specific default access preferences with said identified intended use, said validation engine writing said access control rule to the access control list.

16. The method of claim 15 wherein the schema for receiving and parsing the request message further identifies a method by which the client desires to access the user-specific information in the data store.

17. One or more non-transitory computer-readable storage medium having computer-executable instructions for performing the method recited in claim 12.

* * * * *